United States Patent
Oami et al.

(10) Patent No.: US 10,664,705 B2
(45) Date of Patent: May 26, 2020

(54) OBJECT TRACKING APPARATUS, OBJECT TRACKING SYSTEM, OBJECT TRACKING METHOD, DISPLAY CONTROL DEVICE, OBJECT DETECTION DEVICE, AND COMPUTER-READABLE MEDIUM

(71) Applicant: NEC Corporation, Tokyo (JP)

(72) Inventors: Ryoma Oami, Tokyo (JP); Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 14/865,521

(22) Filed: Sep. 25, 2015

(65) Prior Publication Data

US 2016/0092739 A1  Mar. 31, 2016

(30) Foreign Application Priority Data

Sep. 26, 2014 (JP) ................................ 2014-196176
Nov. 4, 2014 (JP) ................................ 2014-224050

(51) Int. Cl.
*G06K 9/36* (2006.01)
*H04N 5/247* (2006.01)
(Continued)

(52) U.S. Cl.
CPC .......... *G06K 9/00771* (2013.01); *G06T 7/292* (2017.01); *G06T 2207/30196* (2013.01); *G06T 2207/30241* (2013.01)

(58) Field of Classification Search
CPC .......... G06T 2207/30232; G06T 7/292; G06T 2207/20076; G06T 2207/30241; G06T 7/20; G06T 7/246; G06T 7/73; G08B 13/19641; G08B 13/19608; G08B 13/19663; G08B 13/19673; G06K 9/00362; G06K 9/00771; G06K 9/00369
See application file for complete search history.

(56) References Cited

U.S. PATENT DOCUMENTS 8,686,943 B1 * 4/2014 Rafii ....................... G06F 3/017
345/158
2004/0220769 A1 11/2004 Rui et al.
(Continued)

FOREIGN PATENT DOCUMENTS

JP   H08-241480 A   9/1996
JP   2004-72628    3/2004
(Continued)

OTHER PUBLICATIONS

Notification of Reasons for Refusal dated Dec. 11, 2018, issued by the Japanese Patent Office in counterpart Japanese Patent Application No. 2014-224050.
(Continued)

*Primary Examiner* — Alison Slater
(74) *Attorney, Agent, or Firm* — Finnegan, Henderson, Farabow, Garrett & Dunner, L.L.P.

(57) ABSTRACT

An object tracking apparatus, method and computer-readable medium for detecting an object from output information of sensors, tracking the object on a basis of a plurality of detection results, generating tracking information of the object represented in a common coordinate system, outputting the tracking information, and detecting the object on a basis of the tracking information.

21 Claims, 13 Drawing Sheets

(51) Int. Cl.
*G06T 7/00* (2017.01)
*H04N 5/232* (2006.01)
*G06K 9/00* (2006.01)
*G06T 7/292* (2017.01)

(56) References Cited

U.S. PATENT DOCUMENTS

| | | | |
|---|---|---|---|
| 2007/0070201 A1* | 3/2007 | Yokomitsu | G06T 7/246 348/169 |
| 2008/0123900 A1* | 5/2008 | Ma | G06K 9/32 382/103 |
| 2009/0262113 A1* | 10/2009 | Kotake | G02B 27/017 345/427 |
| 2010/0157064 A1* | 6/2010 | Cheng | G06K 9/00771 348/169 |
| 2012/0020518 A1* | 1/2012 | Taguchi | G06T 7/292 382/103 |
| 2012/0327220 A1* | 12/2012 | Ma | G06T 7/292 348/135 |
| 2014/0140576 A1* | 5/2014 | Ikeda | G06K 9/00771 382/103 |
| 2014/0267775 A1* | 9/2014 | Lablans | H04N 5/247 348/169 |
| 2014/0347475 A1* | 11/2014 | Divakaran | G06K 9/00771 348/135 |

FOREIGN PATENT DOCUMENTS

| | | |
|---|---|---|
| JP | 2006-202047 | 8/2006 |
| JP | 2006-245795 A | 9/2006 |
| JP | 2007-64808 | 3/2007 |
| JP | 2009-510541 | 3/2009 |
| JP | 2011-049646 A | 3/2011 |
| JP | 2011-053952 | 3/2011 |
| JP | 2012-080251 A | 4/2012 |
| JP | 2012-099975 A | 5/2012 |
| JP | 2013-210844 A | 10/2013 |
| JP | 2014-036414 A | 2/2014 |
| JP | 2014-59655 | 4/2014 |
| JP | 2014-116912 | 6/2014 |
| WO | WO 2013/012091 A1 | 1/2013 |

OTHER PUBLICATIONS

Decision to Grant a Patent dated Jan. 29, 2019, issued by the Japanese Patent Office in counterpart Japanese Patent Application No. 2014-224050.

Decision to Grant a Patent dated Feb. 4, 2020, issued by the Japanese Patent Office in counterpart Japanese Patent Application No. 2019-031566.

* cited by examiner

FIG. 12
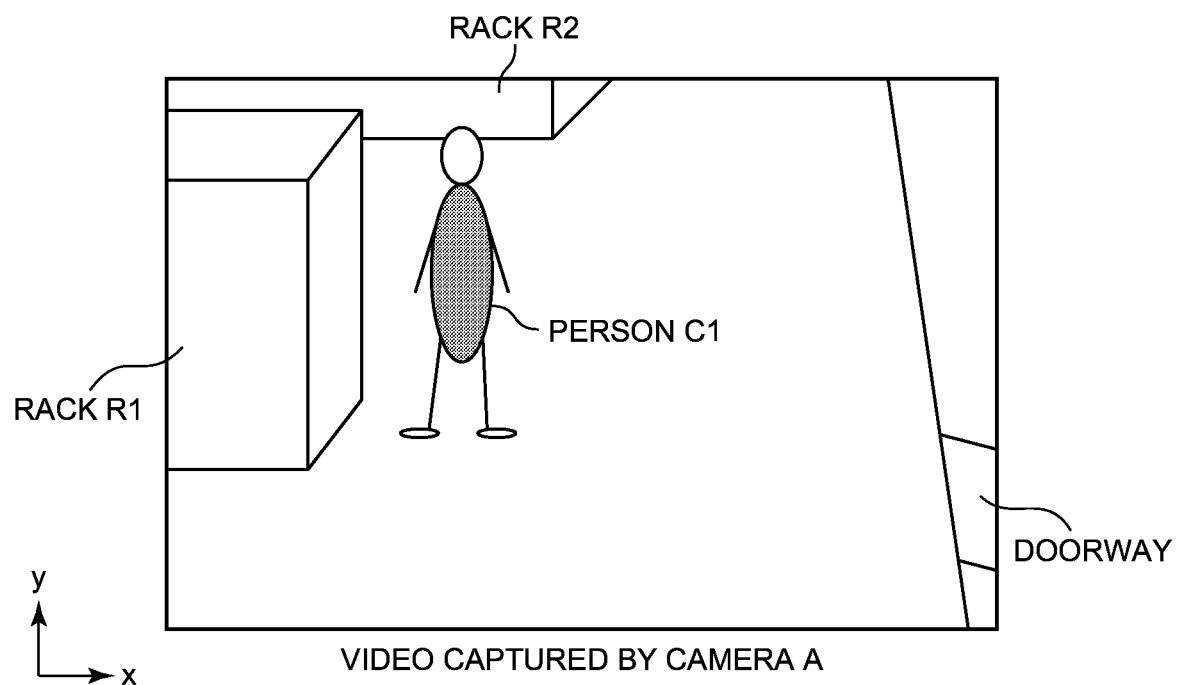
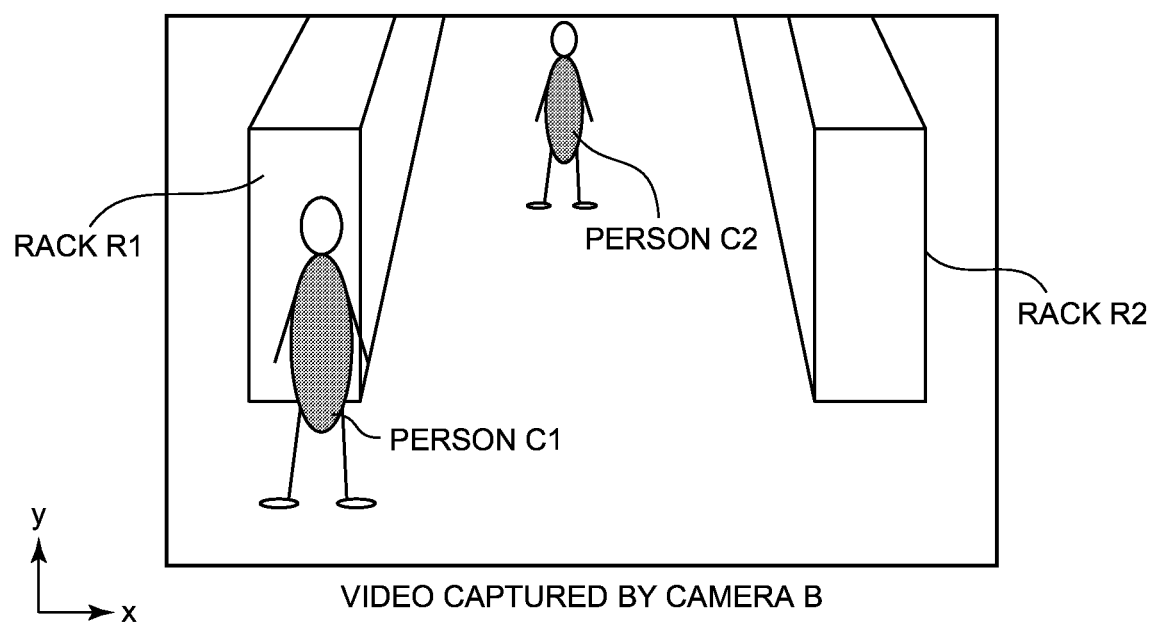

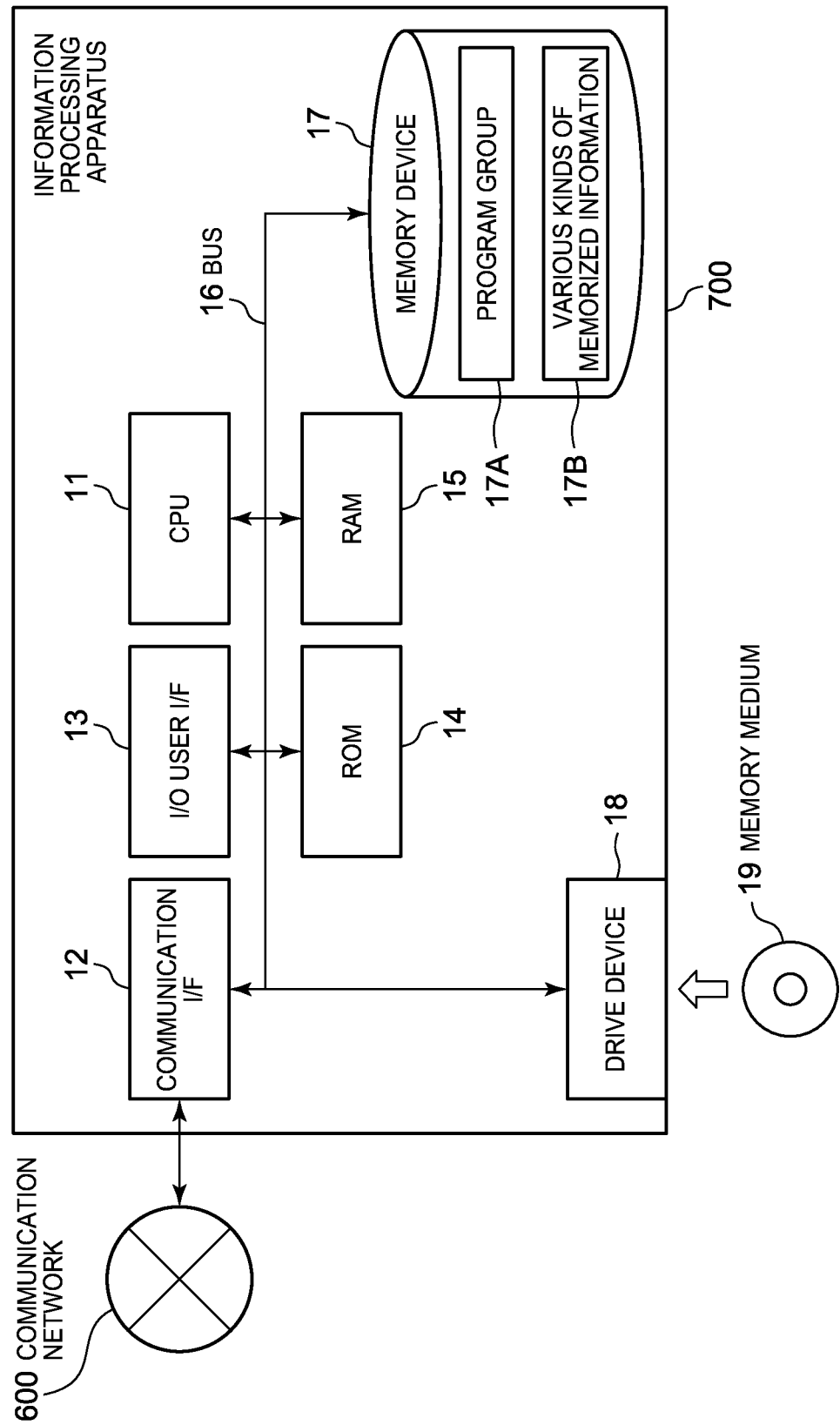

OBJECT TRACKING APPARATUS, OBJECT TRACKING SYSTEM, OBJECT TRACKING METHOD, DISPLAY CONTROL DEVICE, OBJECT DETECTION DEVICE, AND COMPUTER-READABLE MEDIUM

CROSS-REFERENCE TO RELATED APPLICATIONS

This application is based upon and claims priority from Japanese Patent Application No. 2014-196176, filed on Sep. 26, 2014, and Japanese Patent Application No. 2014-224050, filed on Nov. 4, 2014. The entire disclosures of the above-referenced applications are incorporated herein by reference in their entirety.

BACKGROUND

Technical Field

The present disclosure may generally relate to object tracking apparatuses, object tracking systems, object tracking methods, display control devices, object detection devices, programs, and computer-readable media.

Description of the Related Art

In recent years, systems in which plural cameras and the like are used for tracking an object (e.g., a person) have been developed. An example of an object tracking system may include a plurality of tracking devices embedded in a camera, with each of the tracking devices tracking the object in a distributed fashion. For example, the plurality of tracking devices embedded in the camera may co-operate with one another in tracking the object. Another example may be a method for tracking the same object captured by a plurality of capturing devices on the basis of the respective tracking results of individual capturing devices.

Another example in a related art may be a method for excluding an object that does not need tracking.

Another example in a related technique may be an apparatus that detects a moving object in an image captured by one capturing device.

In some embodiments, in the case of the related technology, there may be a possibility that the tracking accuracy for tracking an object (e.g., a moving object) in an image captured by a camera located at a far position from the object becomes degraded. For example, with the related technology, the tracking accuracy of the camera may make it difficult to integrate the tracking results of the object. Moreover, even if the system can integrate the tracking results, the accuracy for detecting the location of the object may become degraded.

SUMMARY OF THE DISCLOSURE

Exemplary embodiments of the present disclosure may overcome disadvantages of prior systems. However, the exemplary embodiments are not required to overcome the specific disadvantages, and the exemplary embodiments of the present disclosure may provide other advantages.

According to an aspect of the present disclosure, an object tracking apparatus is disclosed. The object tracking apparatus may include a memory storing instructions, and at least one processor configured to process the instructions to generate a first detection result of an object from output information of a first sensor, generate a second detection result of the object from output information of a second sensor, generate first tracking information of the object based on a combination of the first and second detection results, wherein the first tracking information is represented in a common coordinate system that is associated with the first and the second sensor, and track the object based on the first tracking information.

According to another aspect of the present disclosure, an object tracking system including sensors and an object tracking apparatus is disclosed. The object tracking apparatus may include a memory storing instructions and at least one processor configured to process the instructions to generate a first detection result of an object from output information of a first sensor, generate a second detection result of the object from output information of a second sensor, generate first tracking information of the object based on a combination of the first and second detection results, wherein the first tracking information is represented in a common coordinate system that is associated with the first and the second sensor, and track the object based on the first tracking information.

According to another aspect of the present disclosure, an object tracking method is disclosed. The tracking method may be performed by at least one processor. The method may include generating a first detection result of an object from output information of a first sensor, generating a second detection result of the object from output information of a second sensor, generating first tracking information of the object based on a combination of the first and second detection results, wherein the first tracking information is represented in a common coordinate system that is associated with the first and the second sensor, and tracking the object based on the first tracking information.

According to another aspect of the present disclosure, an object detection apparatus is disclosed. The object detection apparatus may include a memory storing instructions and at least one processor configured to process the instructions to detect an object from output information of sensors on a basis of tracking information represented in a common coordinate system, and wherein the tracking information indicating tracking result of the object tracked on a basis of a plurality of detection results output from individuals of a plurality of object detection devices.

According to another aspect of the present disclosure, a non-transitory computer-readable storage medium that stores instructions is provided. The instructions, when executed by a computer, may enable the computer to implement a method. The method may include generating a first detection result of an object from output information of a first sensor, generating a second detection result of the object from output information of a second sensor, generating first tracking information of the object based on a combination of the first and second detection results, wherein the first tracking information is represented in a common coordinate system that is associated with the first and the second sensor, and tracking the object based on the first tracking information.

BRIEF DESCRIPTION OF DRAWINGS

FIG. 12 is a schematic diagram illustrating an example of an application of an object tracking apparatus according to embodiments of the present disclosure;

FIG. 19 is a block diagram illustrating an example of a hardware configuration of a computer (information processing apparatus) capable of providing embodiments of the present disclosure.

DETAILED DESCRIPTION

In the following detailed description, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawings.

First Example

Figure 2:
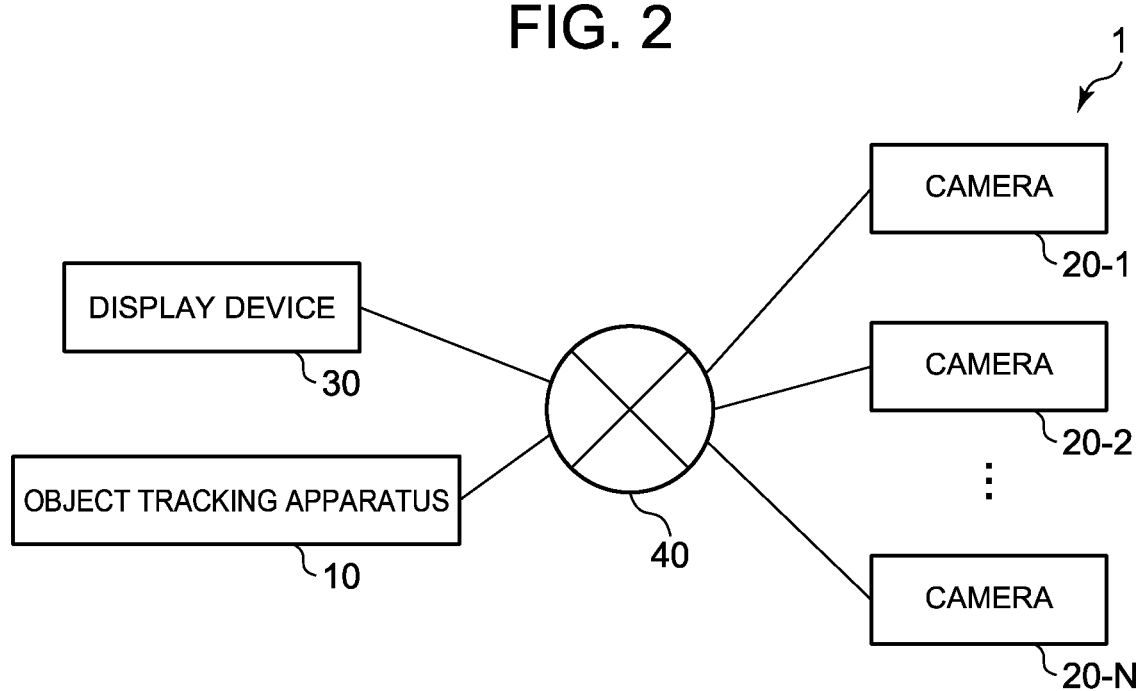
FIG. 2 is a diagram illustrating an example of an object tracking system according to embodiments of the present disclosure.

A first example of the present disclosure will be described in detail with reference to the drawings. With reference to FIG. 2, an object tracking system (also referred to as a system) will be described. FIG. 2 is a diagram illustrating an example of an object tracking system according to embodiments of the present disclosure. As illustrated in FIG. 2, object tracking system 1 may include an object tracking apparatus 10, the plurality of cameras (20-1 to 20-N (N may be a natural number)), and one display device 30 or more. In this example, the plurality of cameras (20-1 to 20-N) may be referred to as cameras 20.

The object tracking apparatus 10, the cameras 20, and the display device 30 may be coupled communicatively with one another via a network 40. In some embodiments, the display device is not included in the object tracking system 1. In some embodiments, the display device 30 may be directly coupled with the object tracking apparatus 10 without being coupled via the network 40.

At least some of cameras 20 may include a sensor for detecting an object. In some embodiments, the cameras 20 may be used as sensors for detecting an object. In other aspects, sensors are not limited to cameras. The sensors may be any devices capable of position measurement such as radio sensors. In some embodiments, a combination of a plurality of sensors such as an integrated combination of a radio sensor and a camera may be used. The object tracking apparatus 10 may obtain visual information such as color information by using the cameras 20 as a sensor.

In this example, the following descriptions will be made under the assumption that information captured by a sensor includes information related to a video captured by at least one of cameras 20. In some embodiments, if a sensor is a radio sensor, information captured by the sensor may include information related to a radio wave captured by the radio sensor.

The object tracking apparatus 10 may be an apparatus for tracking objects in videos captured by individuals of the plurality of cameras 20. The functional configuration of the object tracking apparatus 10 will be described below with reference to other drawings.

The display device 30 may display tracking results of objects obtained by the object tracking apparatus 10. The display device 30 may be a device that displays a video captured by at least one of the cameras 20. The display device 30 may be a device that displays trajectory information and the like.

(Object Tracking Apparatus 10)

Figure 1:
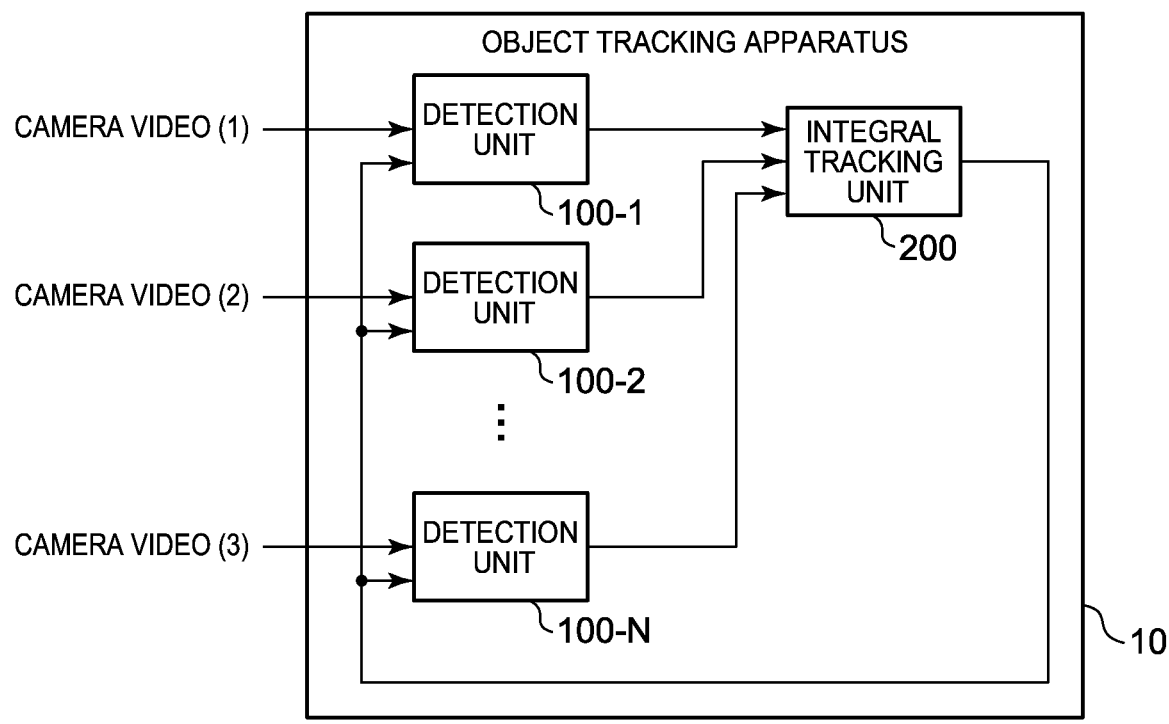
FIG. 1 is a block diagram illustrating an example of an object tracking apparatus according to embodiments of the present disclosure.

An example of object tracking apparatus 10 will be described as follows. FIG. 1 is a block diagram illustrating an example of the functional configuration of an object tracking apparatus (e.g., object tracking apparatus 10 of FIG. 2) according to embodiments of the present disclosure. As illustrated in FIG. 1, the object tracking apparatus 10 may include a plurality of detection units (100-1 to 100-N) and an integral tracking unit 200. In this example, the plurality of detection units (100-1 to 100-N) may be referred to collectively as detection units 100.

(Detection Unit 100)

The detection units 100 may detect an object using output information from the cameras 20 on the basis of tracking information that is output from the integral tracking unit 200 as described below and that is related to the object on a frame before the target frame from which the object is to be detected. In this example, the output information from the cameras 20 may include information related to video data captured by the cameras 20.

In this example, it is assumed that individuals of the plurality of detection units 100 and individuals of the plurality of cameras 20 are associated on a one-to-one basis.

For example, the detection unit 100-1 may detect objects from a video captured by the camera 20-1, and the detection unit 100-2 may detect objects from a video captured by the camera 20-2. But embodiments of the present disclosure are not limited to such an association. For example, the detection unit 100-1 may detect objects from a video captured by the camera 20-N, where N is any number other than 1.

In some embodiments, individuals of the plurality of detection units 100 and individuals of the plurality of cameras 20 is not associated on a one-to-one basis. For example, the detection unit 100-1 may detect objects from videos captured by, for example, cameras 20-1 and 20-2.

The operation of a detection unit 100 will be described as follows. A detection unit 100 may receive video data captured by a corresponding camera 20 (hereinafter, the video data may be referred to as a "camera video"). For example, as shown in FIG. 1, video data captured by a camera 20-n (wherein n may represent any of 1 to N) may be denoted as a camera video (n). The camera video may be a video that is captured, in real time, by one of cameras 20 (e.g., a surveillance camera). The camera video may also be a video that was captured earlier by one of the cameras 20, stored in a memory unit or the like, and is then decoded (or reproduced) afterward. The video data may include time information indicating time at which the video is captured.

The detection unit 100 may receive tracking information related to the object on the previous frame from the integral tracking unit 200. The previous frame may be a frame just before a target frame from which the object is to be detected (the current frame). The previous frame may also be a frame that is located a predetermined number of frames before the current frame. Tracking information on one previous frame or tracking information on a plurality of previous frames may be used for detecting the object. In a case where the detection unit 100 performs detection of an object on the first frame, the detection unit 100 does not receive the tracking information related to the object (or does not use tracking information related to the object), because there is no tracking information related to the object on the previous frame.

The detection unit 100 may perform detection of the object from the received camera video using the camera video and tracking information related to the object on the previous frame. The detection performed by the detection unit 100 will be referred to as object detection. As described above, in the case where the object detection is performed on the first frame, the detection unit 100 may perform the object detection without using the tracking information related to an object on the previous frame. For the following disclosure, a detected object will be referred to as a "target," and each target is associated with a target region. For example, in a case where a target is an object, the target region can include a region bounded by a boundary of the object. In some embodiments, the detection result of an object (also referred to as an "object detection result" or a "detection result" hereinafter) may become a set of targets.

An object detection result may include information for each target, for example, information indicating the position of the target, the size of the target, and the like. In some embodiments, the object detection result may include, for example, information indicating a rectangle circumscribing a region in a frame of a video from which each target is detected, the coordinate values of the centroid of the target region, information indicating the width of each target, information indicating the height of each target, and the like. In some embodiments, the object detection result may include other information. For example, the object detection result may include the coordinate values of the uppermost end and the lowermost end of the target region instead of or in addition to the coordinate values of the centroid of the target region. The object detection result may also include information for each target such as information indicating the position and size of each target.

For the following disclosure, descriptions will be made based on an example in which an object detection result includes the coordinate values of the lowermost end of each target and information indicating a rectangle circumscribing each target. In some instances, the coordinate values of the lowermost end of the target may coincide with the coordinate values of a point at which the object contacts a floor (e.g., the ground) and/or the coordinate values of the midpoint of the lower side of a rectangle circumscribing the object. In some instances, if the object is a person, the coordinate values of the target may be the coordinate values of the position of his/her feet.

In some embodiments, the detection unit 100 may transform the coordinate values included in the object detection result into coordinate values in a common coordinate system defined for a space to be captured by a combination of the plurality of cameras 20 (hereinafter referred to as "capturing space"). The transformed coordinate values can then be provided as part of the object detection result.

An object detection result may also include information indicating the shape of each target in addition to the above-described information. In some embodiments, the object detection result may include silhouette (or contour) information indicating a target boundary that defines the target region, and the like. The silhouette information may include information that distinguishes pixels inside the target region and pixels outside the target region. For example, the silhouette information may be image information that sets the values of the pixels inside the target region to 255 and the values of the pixels outside the target region to 0. For example, the silhouette information may be information indicating values obtained by extracting shape descriptors (shape features), which are standardized in MPEG-7, from the silhouette shape. In some embodiments, an object detection result may also include the appearance features of an object. For example, the object detection result may include the features related to the color, pattern, shape, and the like of the object.

In some embodiment, an object detection result may include information indicating a likelihood that represents the accuracy (e.g., to indicate the reliability) of the detection of an object (hereinafter referred to as "target likelihood information"). The target likelihood information may include information for calculating the likelihood of correctly detecting the object. In some embodiments, the target likelihood information may include information related to the predicted accuracy of object detection such as the score value at the time of object detection, the distance of the detected object from the camera, the size of the detected object, and the like. In some instances, the detection unit 100 may calculate the likelihood of detecting the object itself, and set the calculated target likelihood to the likelihood indicated by the target likelihood information.

The detection unit 100 may output the target detection result to the integral tracking unit 200.

(Integral Tracking Unit 200)

The integral tracking unit 200 may receive detection results output from the respective detection units 100. The integral tracking unit 200 may track an object on the basis of the respective detection results. In some instances, the integral tracking unit 200 may track one or more objects, or perform object tracking by using an object detection result related to the one or more objects, which are detected by the detection units 100 from videos captured by the respective cameras 20, with each of the cameras 20 being associated with a corresponding detection unit 100. In some embodiments, the integral tracking unit 200 may generate one or more tracking results of the respective object(s) (object tracking results) represented in the common coordinate system. As described above, the integral tracking unit 200 may integrate object detection results detected by the respective detection units 100 from videos captured by the respective cameras 20, with each of the cameras 20 being associated with a corresponding detection unit 100. In some embodiments, object tracking performed by the integral tracking unit 200 may be referred to as object integral tracking.

Information generated for each object as an object tracking result may be referred to hereinafter as a tracker. In some embodiments, a tracker may include information indicating the position of a tracked object, information related to the motion model of the object, and the like, as information related to the tracked object (or as an object tracking result). In some embodiments, information included in the tracker is not limited to the above-described information. Because the position of a tracked object can occur at a time before the current time, the tracker may include information about the past positions of the object.

Figure 3:
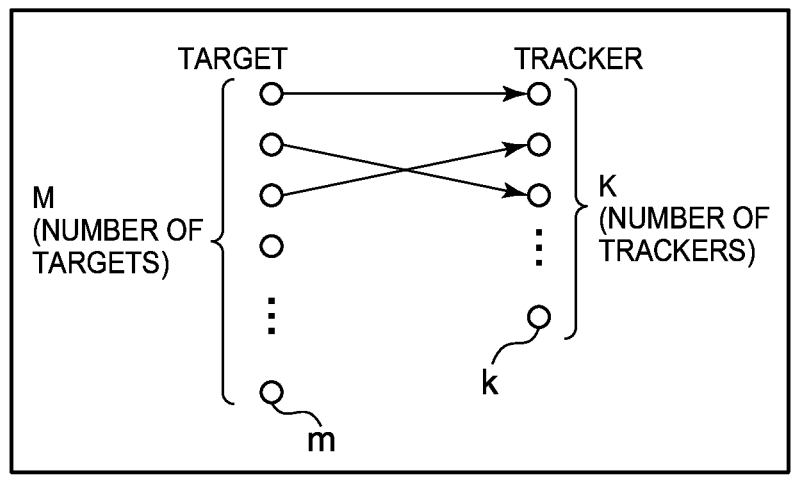
FIG. 3 is a diagram describing an example of an association between targets and trackers according to embodiments of the present disclosure.

In some embodiments, object tracking may be regarded as processing in which, by associating a target detected by object detection with a tracker generated before the detection of the detected target, objects in respective frames can then be associated with each other. The object tracking will be described with reference to FIG. 3. FIG. 3 is a diagram describing an example of processing in which targets and trackers are associated by the integral tracking unit 200. As illustrated in FIG. 3, it is assumed that the number of targets is M and the number of trackers is K (M and K may be integers equal to 0 or larger). The integral tracking unit 200 may associate individuals of these M targets with individuals of these K trackers. When the integral tracking unit 200 associates a target with a tracker, the integral tracking unit 200 may predict a current position of an object with reference to the past position of the object indicated by information included in the tracker, and associate the target with the tracker using an index indicating the relation between the target and the tracker.

In some instances, the integral tracking unit 200 may predict the position of the object on the current frame on the basis of the position of the object detected on the previous frame and the motion model of the object calculated and stored for each tracker. The prediction may involve applying a Kalman filter, a particle filter, etc.

For example, the integral tracking unit 200 may associate an object tracking result (tracker) on the previous frame with an object included in the detection result (target) based on at least some of the following factors:

(1) a distance (e.g., degree of closeness) between the position of the object on the current frame predicted using the tracker and the position of the target;

(2) a relationship (e.g., similarity) between an appearance feature of the target and that of the object whose tracking result is indicated by the tracker;

(3) the likelihood of detecting the object and the likelihood of tracking the object (a likelihood of a tracker).

In some embodiments, it may be possible to make the association processing reduce to a cost minimization problem in a bipartite graph as illustrated in FIG. 3. In some embodiments, the integral tracking unit 200 may solve above-described problem using an algorithm such as the Hungarian method.

In FIG. 3, an example of a case where some targets and respective trackers are associated with each other is illustrated by arrows. For example, the uppermost target may be associated with the uppermost tracker.

In some embodiments, if there is a target that is not associated with any tracker, the integral tracking unit 200 may determine whether the target can be regarded as a newly appeared object or not. If the integral tracking unit 200 determines there is a high possibility that the target has newly appeared, the integral tracking unit 200 may generate a new tracker related to the target. For example, in FIG. 3, it is assumed that a target with a symbol m (referred to as a target m hereinafter) is a target that is not associated with any tracker. In this case, the integral tracking unit 200 may determine whether the target m can be regarded as a newly appeared object or not, and if the target m can be regarded so, the integral tracking unit 200 may generate a new tracker related to the target m.

In some embodiments, if there is a tracker that is not associated with any target, the integral tracking unit 200 may determine whether or not the tracker indicates information related to an object that has disappeared from the capturing space. If there is a high possibility that the tracker indicates information related to an object that has disappeared from the capturing space, the integral tracking unit 200 may delete the tracker. For example, in FIG. 3, it is assumed that a tracker with a symbol k (referred to as a tracker k hereinafter) is a tracker that is not associated with any target. In this case, the integral tracking unit 200 may determine whether the tracker k indicates information related to a disappeared object or not, and if the tracker k indicates information related to the disappeared object, the integral tracking unit 200 may delete the tracker k.

The integral tracking unit 200 may continue to perform object tracking by repeating the above-described processes on a frame-by-frame basis. In some embodiments, the integral tracking unit 200 may associate an identifier (e.g., a unique ID) with each tracker related to videos captured by the cameras 20, and manage each tracker (and the associated tracking result) using the corresponding identifier. In some embodiments, the integral tracking unit 200 may include a value obtained by evaluating the reliability of a tracking result (hereinafter, referred to as a "likelihood of a tracker") into the tracker as a parameter of the tracker. In some embodiments, the newest position of a tracked object among positions indicated by information that is included in the corresponding tracker and that represents the positions of the tracked object will be referred to hereinafter as "the position of the tracker." The size of the object at the newest position will be referred to hereinafter as "the size of the tracker."

The integral tracking unit 200 may update information indicating the position of each tracker, the likelihood of each tracker, and the like on the basis of the result of the association processing. Information related to the position of a tracker may be information represented in a common coordinate system defined in a capturing space captured by the plurality of cameras 20. The information represented in the common coordinate system may include information related to coordinate values in the common coordinate system. The coordinate values in the common coordinate system may be, for example, coordinate values indicating the position on a floor. A coordinate system associated with each of cameras 20 may be referred to as the "individual coordinate system" of one of cameras 20. The individual coordinate system may be a coordinate system on an image captured by one of cameras 20. Hereinafter, the following descriptions will be made based on information related to positions represented as coordinate values in the common coordinate system, and based on information related to positions represented as coordinate values in the individual coordinate system of at least some of cameras 20.

The integral tracking unit 200 may generate a tracker whose information is updated on the basis of the result of the association processing as a new object tracking result. The integral tracking unit 200 may output, for example, information indicating the position and/or size of the tracker, information indicating the likelihood of the tracker, and the like as tracking information.

The tracking information may include the coordinate values of each tracker in the common coordinate system as information indicating the position of each tracker. The tracking information may be fed back to the detection units 100. In some embodiments, the detection units 100 may receive the tracking information, and use the tracking information for detecting objects on the following frames.

The integral tracking unit 200 may be configured so as to output the object tracking result including both above-described tracking information and other information included in the tracker to the detection units 100.

As described above, the object tracking apparatus 10 according to embodiments of the present disclosure may perform object tracking by integrating object detection results based on videos captured by individuals of the plurality of cameras 20. The object tracking apparatus 10 may provide the obtained tracking information for object detection on the following frame.

As described above, the object tracking apparatus 10 may detect objects from videos using the tracking result related to a previous frame. For example, if there is an object whose video data is not captured by a first camera 20 but is captured by a second camera 20, the object tracking apparatus 10 may use the tracking result of the above-described object for object detection related to a video captured by the first camera 20. In such a manner, when the above-described object later appears in an area whose video data is captured by the first camera 20, the associated detection unit 100 can detect the above-described object. As a result, the object tracking apparatus 10 can perform object tracking related to the above-described object.

The object tracking apparatus 10 can improve the accuracy of object detection in comparison with a case where the tracking result related to the previous frame is not used. Because the object tracking apparatus 10 performs object tracking using the detection results from a plurality of detection units, the accuracy of the tracking result obtained as a whole may also be improved.

(Detail of Detection Unit 100)

Figure 4:
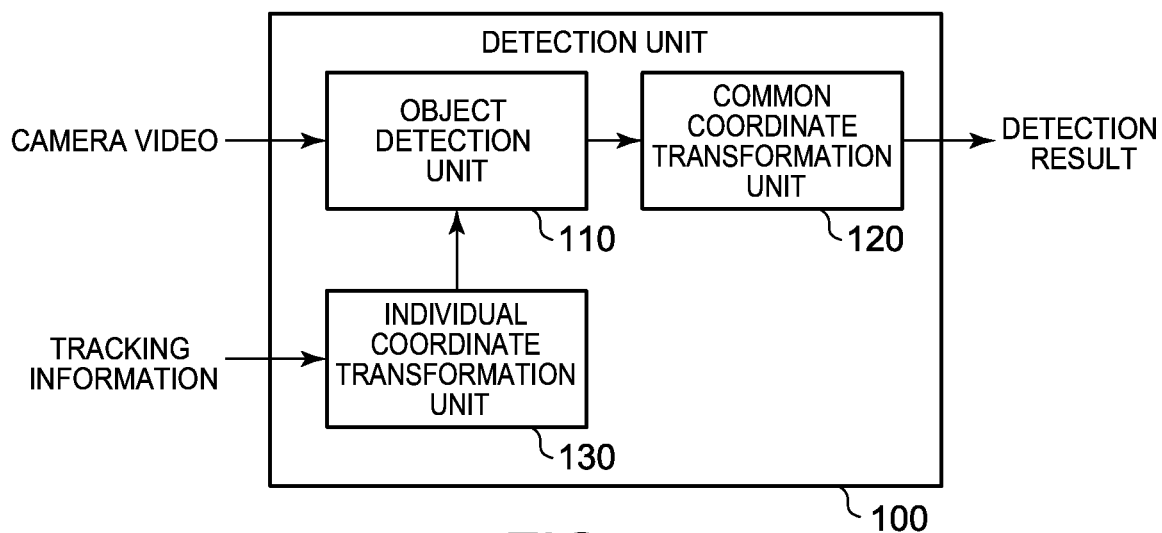
FIG. 4 is a block diagram illustrating an example of a detection unit of an object tracking apparatus according to embodiments of the present disclosure.

The functions of the respective units of the object tracking apparatus 10 will be described in more detail with reference to FIGS. 4 to 8. FIG. 4 is a block diagram illustrating an example of a detection unit 100 of the object tracking apparatus 10 according to embodiments of the present disclosure. As illustrated in FIG. 4, the detection unit 100 may include an object detection unit 110, a common coordinate transformation unit (hereinafter referred to as "second transformation unit") 120, and an individual coordinate transformation unit (hereinafter referred to as "first transformation unit") 130. In FIG. 4, a camera video (n) (n can be any integer from 1 to N) that the detection unit 100 receives, as shown in FIG. 1, is denoted as a camera video.

The individual coordinate transformation unit 130 may receive tracking information output from the integrated tracking unit 200. The individual coordinate transformation unit 130 may transform the coordinate values of each tracker in the common coordinate system into coordinate values within a frame captured by the corresponding camera 20 (e.g., the coordinate values represented in an individual coordinate system associated with the corresponding camera 20). When it is assumed that coordinate values in the common coordinate system is (X, Y, Z), and coordinate values in the individual coordinate system of the camera 20 is (x, y), the individual coordinate transformation unit 130 may calculate the coordinate values (x, y) in the individual coordinate system of the corresponding camera 20 associated with the detection unit 100 that includes the individual coordinate transformation unit 130 from the coordinate values of a tracker (X, Y, Z) in the common coordinate system. In this case, the individual coordinate transformation unit 130 may obtain at least camera parameters that represent the camera position, the camera posture, and the like of the corresponding camera 20 associated with the detection unit 100 by performing calibration. In some embodiments, the individual coordinate transformation unit 130 may transform the coordinate values in the common coordinate system into coordinate values in the individual coordinate system of the camera 20 using the obtained camera parameters.

In some embodiments, the camera parameters may be stored in a memory unit in the detection unit 100. In other aspects, the camera parameters may be stored in a memory region in the individual coordinate transformation unit 130. In the latter case, the individual coordinate transformation unit 130 may be configured so as to provide the camera parameters to the common coordinate transformation unit 120.

For example, it is assumed that an object is a person, and information indicating the position of the corresponding tracker includes information indicating the coordinate values of the foot position of the person and the coordinate values of the top position of the head of the person. It is assumed that the coordinate values of the foot position are (X0, Y0, 0) and the coordinate values of the top position of the head are (X0, Y0, H) (H may be the height of the person). It is assumed that a camera 20 that is associated with a detection unit 100, which includes an individual coordinate transformation unit 130, is the camera 20-1.

In this case, the individual coordinate transformation unit 130 may calculate the foot position (x0, y0) and the top position of the head (x1, y1) on a frame captured by the camera 20-1 using camera parameters related to the camera 20-1. If the information indicating the position of the tracker includes information indicating a circumscribing rectangle, the common coordinate transformation unit 120 as described below may already have calculated the value representing the width of the circumscribing rectangle by transforming the value representing the width of the circumscribing rectangle into a value of the width in the common coordinate system using the camera parameters. In this case, the individual coordinate transformation unit 130 may use a value that is obtained by transforming again the value of the width in the common coordinate system into that in the individual coordinate system by using the above-described camera parameters as the width of the circumscribing rectangle.

In some cases, one camera 20 cannot capture the video data of all of the objects associated with each of the trackers, and there may be a case where one or more objects are outside the field of view of the one camera 20. In some embodiments, if information indicating the position of a tracker included in tracking information includes information related to an object that is outside the field of view of a camera 20 associated with a detection unit 100, the corresponding individual coordinate transformation unit 130 does not calculate the coordinate values of the object in the individual coordinate system of the above-described camera 20. In this case, the individual coordinate transformation unit 130 may exclude the coordinate values of a tracker associated with an object that is not viewable (e.g., outside the field of view) of the camera 20 from transformation from the common coordinate system into the individual coordinate system. In some embodiments, the individual coordinate transformation unit 130 may register an area of coordinate values in the common coordinate system, which is within the field of view by each camera 20, in advance in a memory unit or the like for each camera 20, and determine whether each object is located within the area that reflects field of view of each camera or not. In other aspects, the individual coordinate transformation unit 130 may actually transform the coordinate values of an object in the common coordinate system into a coordinate values in the individual coordinate system, and when the transformed coordinate values indicates a location outside a region monitored by a camera 20 associated with the detection unit 100, or a coordinate values in the relevant individual coordinate system cannot be obtained, the individual coordinate transformation unit 130 may determine that the object whose coordinate values is transformed is not within the field of view of the camera 20.

The individual coordinate transformation unit 130 may output the result obtained by transforming the coordinate values of trackers, which are included in tracking information output from the integral tracking unit 200, in the common coordinate system (e.g., tracking information) into the coordinate values in the individual coordinate system of the camera 20 associated with the detection unit 100. In some embodiments, the individual coordinate transformation unit 130 may transform tracking information represented in the common coordinate system into tracking information represented in the individual coordinate system, and output the transformed tracking information to the object detection unit 110. Hereinafter, the phrase denoted by "coordinate values of the individual coordinate system" may represent coordinate values of the individual coordinate system of a camera 20 which is associated with a detection unit 100.

The object detection unit 110 may receive a camera video from the camera 20 associated with the detection unit 100 including the object detection unit 110. The object detection unit 110 may receive the tracking information, which is transformed into the information indicating the coordinate values in the individual coordinate system, from the individual coordinate transformation unit 130. The object detection unit 110 may detect objects from the received camera video on the basis of the above-described tracking information.

In some embodiments, the object detection unit 110 may generate a detection result. The object detection unit 110 may output the generated detection result to the common coordinate transformation unit 120. In some embodiments, the detection result may be a detection result represented in the individual coordinate system.

Figure 5:
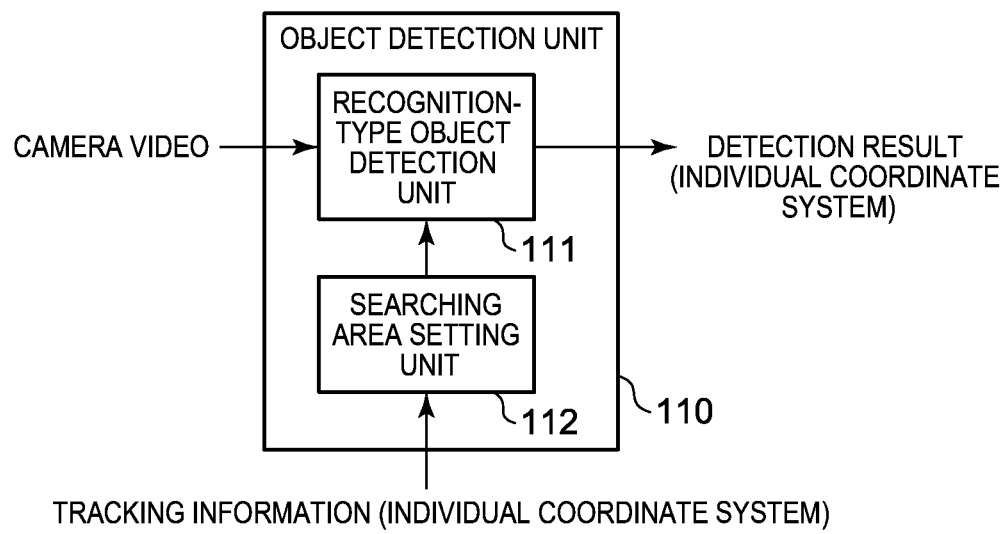
FIG. 5 is a block diagram illustrating an example of an object detection unit of an object tracking apparatus according to embodiments of the present disclosure.

The configuration of the object detection unit 110 will be described in more detail with reference to FIG. 5. FIG. 5 is a block diagram illustrating an example of object detection unit 110 according to embodiments of the present disclosure.

As illustrated in FIG. 5, the object detection unit 110 may include a recognition-type object detection unit (a first object detection unit) 111 and a searching area setting unit 112.

The searching area setting unit 112 may receive the tracking information, which is transformed into the coordinate values in the individual coordinate system, from the individual coordinate transformation unit 130. The searching area setting unit 112 may obtain an area (e.g., a searching area) within which an object on the current frame is searched, using the tracking information transformed into the coordinate values in the individual coordinate system. In some embodiments, the searching area setting unit 112 may predict the position of the object on the current frame on the basis of tracking information including the corresponding tracking result related to the previous frame. The searching area setting unit 112 may obtain a searching area within which the object is searched for using the predicted position. In some embodiments, the searching area may also be referred to as an object detection area.

In some embodiments, the tracking information that the searching area setting unit 112 receives may be information related to a tracking result of the object on the past frame viewed from the time of a frame on which processing is currently to be performed. In some embodiments, the tracking result of the object on the past frame may also be referred to as the past tracking result of the object. The searching area setting unit 112 may predict the motions of each object, and predict the positions of each object on the current frame. The predicted position of an object will be referred to as predicted position. The searching area setting unit 112 may set the vicinity of the predicted position to the searching area for the object.

The searching area setting unit 112 may predict the motion of each object using the motion model of the corresponding object calculated from the past tracking result. For example, if the position of an object has not changed among the tracking results of the past several frames (at least the past two frames), the searching area setting unit 112 may determine that the object is standing still, and regard the position of the object obtained from the tracking result of the object as the predicted position. For example, if tracking results of past several frames indicate that an object is moving, the searching area setting unit 112 may assume that the object is moving at a constant velocity, and calculate the predicted position in consideration of time differences between the current time and the times of the past frames.

The tracking results related to the past several frames used by the searching area setting unit 112 when the searching area setting unit 112 predicts the motion of each object may be included in the tracking information. The motion model of each object obtained from the tracking results related to the past several frames may be included in the above-described tracking information.

In some embodiments, the predicted position may be included in the tracking information. The integral tracking unit 200 may include the value which is obtained using a Kalman filter or a particle filter from the object tracking into the tracking information as the predicted position.

In some cases, there may be a possibility that a new object appears in the peripheral part of the area which can be captured by a camera 20, within the field of view of the camera 20. Moreover, in a case where the site which a camera 20 captures includes a doorway or the like, there may be a possibility that a new object appears in the field of view of the camera 20. The searching area setting unit 112 may include such areas (the peripheral of the frame and/or the doorway) on the frame included in a video captured by the camera 20 into the relevant object searching areas.

The searching area setting unit 112 may output information indicating the set object searching area (searching area information) to the recognition-type object detection unit 111.

The recognition-type object detection unit 111 may receive the searching area information from the searching area setting unit 112. The recognition-type object detection unit 111 may detect an object from a camera video input on the basis of the received searching area information. The recognition-type object detection unit 111 may temporarily store the frame of the input camera video in a memory section such as a buffer therein. The recognition-type object detection unit 111 may receive the searching area information, and perform object detection processing using the searching area information. In some instances, the recognition-type object detection unit 111 may perform object detection within an area indicated by the searching area information (within the searching area) using a discriminator that has been made to learn the image features of the object.

For example, if an object is a person, the recognition-type object detection unit 111 may perform the detection of the person using a discriminator that has been made to learn the characteristic areas of a person (for example, the head area or upper body of the person). For example, the recognition-type object detection unit 111 may use a discriminator that has been made to learn the entirety of a person as the above-described discriminator. The recognition-type object detection unit 111 may use various types of discriminators as the discriminator. For example, the recognition-type object detection unit 111 may use a discriminator that has been made to learn the images of the head area, upper body, entire body, and the like of a person by means of a CNN (convolutional neural network). For example, the recognition-type object detection unit 111 may perform feature extraction such as HOG (Histogram of Oriented Gradients) feature extraction, and use a discriminator such as SVM (support vector machine) or GLVQ (generalized learning vector quantization). In some instances, the recognition-type object detection unit 111 may use various existing recognition-based detection techniques other than the above-described techniques.

As described above, the recognition-type object detection unit 111 according to the present example may detect an object within a searching area set by the searching area setting unit 112. In some embodiments, the recognition-type object detection unit 111 may perform object detection within a searching area that the searching area setting unit 112 narrows down using the tracking result on the previous frame. Because the recognition-type object detection unit 111 may avoid performing object detection within an area where there is little possibility that the object exists, superfluous erroneous detection may be prevented from being performed. Further, the recognition-type object detection unit 111 can speed up object detection processing.

The searching area within which the recognition-type object detection unit 111 performs object detection may include not only an area indicated by searching area information but also an area determined by silhouette information calculated by using background subtraction processing. In some embodiments, the recognition-type object detection unit 111 may use a common area of an area determined by silhouette information and an area indicated by object searching area information as an area within which object detection is performed (e.g., a searching area).

The recognition-type object detection unit 111 may generate a result of performing the object detection (a detection result), and output the detection result to the common coordinate transformation unit 120. In some embodiments, the coordinate values of the object included in the detection result may include coordinate values in the individual coordinate system.

With reference to FIG. 4, the common coordinate transformation unit 120 of the detection unit 100 will be described. The common coordinate transformation unit 120 may receive the object detection result represented in the individual coordinate system from the object detection unit 110. The common coordinate transformation unit 120 may transform the coordinate values in the individual coordinate system included in the received detection result into coordinate values in the common coordinate system. As described above, the common coordinate transformation unit 120 can generate information for integrating the detected positions of objects related to the respective cameras 20.

In some embodiments, the common coordinate transformation unit 120 may transform the coordinate values in the individual coordinate system included in the object detection result into coordinate values in the common coordinate system using the camera parameters of the camera 20 which is associated with the detection unit 100 including the common coordinate transformation unit 120. For example, if the coordinate values of the lowermost end of an object on a frame captured by the camera 20 are (x0, y0), the common coordinate transformation unit 120 may transform the coordinate values into coordinate values (X0, Y0, 0) in the common coordinate system. Because it is assumed that the ground is a plane with Z=0, a Z-axis component of the transformed coordinate values may become 0. It is assumed that the coordinate values of the uppermost end of the object is (x1, y1) and that the height of the object is H, and that the uppermost end of the object is just above the lowermost end of the object (in the vertical direction). In this case, the common coordinate transformation unit 120 may transform the coordinate values of the uppermost end of the object (x1, y1) into coordinate values in the common coordinate system (X0, Y0, H). The common coordinate transformation unit 120 may calculate the height of the object by searching for H that satisfies the transformation condition as described above. As described above, the common coordinate transformation unit 120 may calculate coordinate values (X, Y, Z) in the common coordinate system for each of detected objects.

If H has been already known, the common coordinate transformation unit 120 may use the already-known value as it is.

The common coordinate transformation unit 120 may output the detection result including transformed coordinate values (coordinate values in the common coordinate system) to the integral tracking unit 200. In some embodiments, the common coordinate transformation unit 120 may output the detection result represented in the common coordinate system to the integral tracking unit 200. The common coordinate transformation unit 120 may include the silhouette information and information about the appearance features (color, pattern, shape, etc.) and the like into each of one or more objects included in the detection result as information related to each object. The common coordinate transformation unit 120 may output the detection result including the above-described information to the integral tracking unit 200.

(Detail of Integral Tracking Unit 200)

Figure 6:
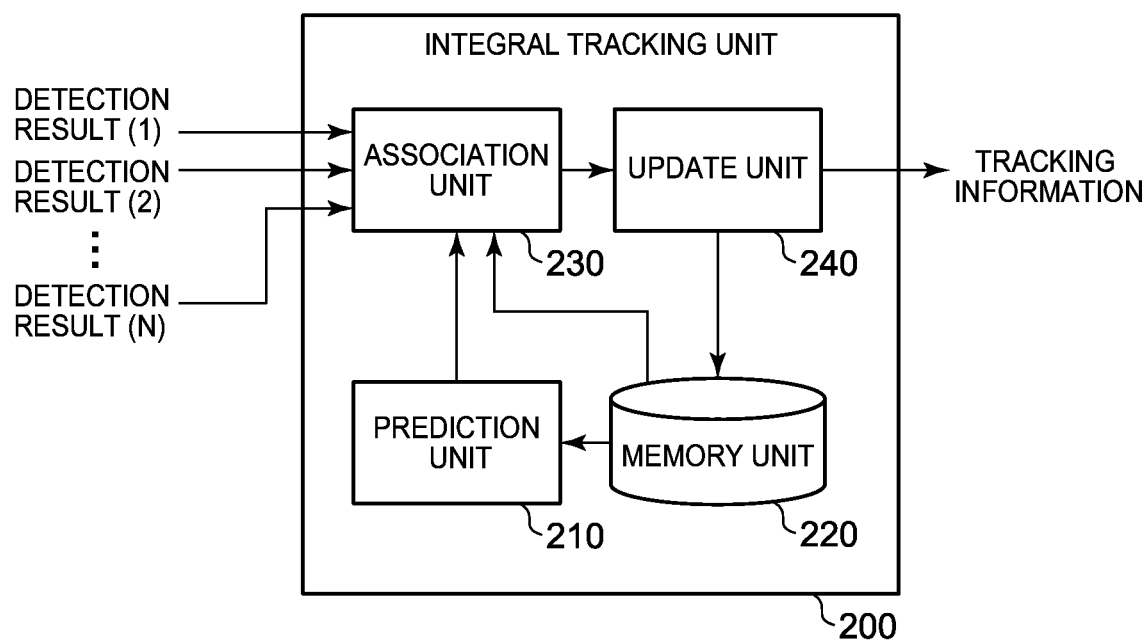
FIG. 6 is a block diagram illustrating an example of an integral tracking unit of an object tracking apparatus according to embodiments of the present disclosure.

The functional configuration of the integral tracking unit 200 will be described in more detail with reference to FIG. 6. FIG. 6 is a block diagram illustrating an example of integral tracking unit 200 of the object tracking apparatus 10 according to embodiments of the present disclosure. As illustrated in FIG. 6, the integral tracking unit 200 may include a prediction unit 210, a memory unit 220, an association unit 230, and an update unit 240. Because the integral tracking unit 200 may sequentially track videos from each of the cameras 20 on a camera-by-camera basis, the integral tracking unit 200 may also be referred to as a sequential tracking unit.

Figure 7:
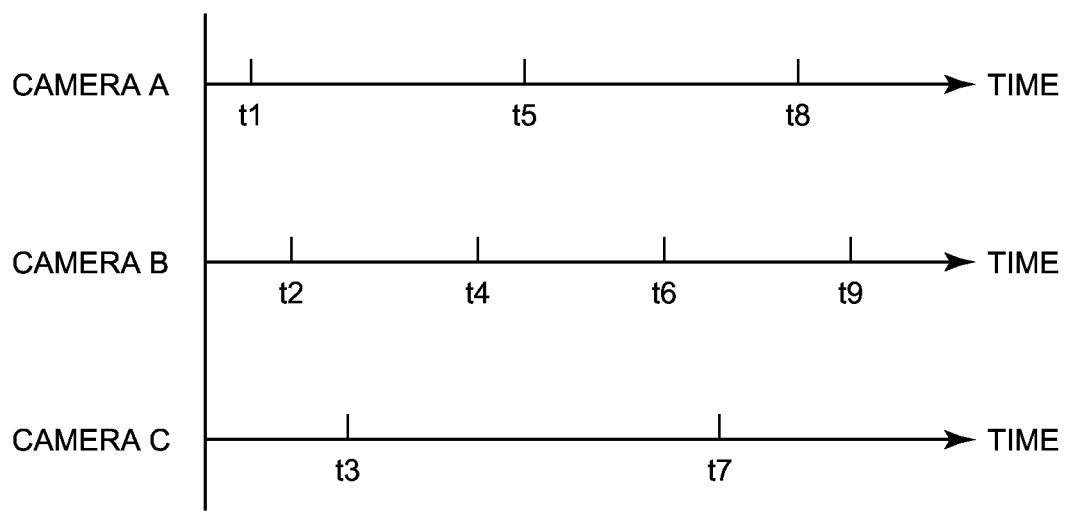
FIG. 7 is a diagram describing an example of object sequential tracking processing performed by an example of an object tracking apparatus according to embodiments of the present disclosure.

An example of sequential object tracking (also referred to as object sequential tracking or sequential integral tracking) performed by the integral tracking unit 200 will be described with reference to FIG. 7. FIG. 7 is a diagram for describing an object sequential tracking processing performed by the integral tracking unit 200 according to embodiments of the present disclosure. FIG. 7 may be an example illustrating timing at which each of a camera A, a camera B, and a camera C (of the plurality of cameras 20) obtains an image in a case where the number of cameras is three. In FIG. 7, each of horizontal axes is a time axis; the righter a time point is located along the time axis, the later time the time point indicates. As illustrated in FIG. 7, it is assumed that the camera A obtains images at the time t1, t5, and t8. Similarly, it is assumed that the camera B obtains images at the time t2, t4, t6, and t9, and it is assumed that the camera C obtains images at the time t3, and t7.

As illustrated in FIG. 7, the times at which frames (images) are obtained by respective cameras 20 (time stamps) do not always coincide across all the cameras 20, and it may be typical that they do not coincide. In some cases, frame intervals may be different from one camera 20 to another. A camera 20 can capture frames between non-uniform frame intervals.

The detection unit 100 may perform detection in a chronological order related to camera videos, which are output asynchronously from these cameras 20, and output detection results to the integral tracking unit 200.

The integral tracking unit 200 according to the present example may perform sequential tracking processing on images in the order of occurrences of the images. In some embodiments, in FIG. 7, the integral tracking unit 200 may perform integration of the object detection results of the respective cameras using an object detection result related to an image captured at the time t1 by the camera A, and perform object tracking. The integral tracking unit 200 may perform integration of the object detection results of the respective cameras using object detection results related to images captured at the times t2 by the camera B, t3 by the camera C, t4 by the camera B, and so on in this order, and perform object tracking. In a case where not all objects are within the field of view of all of the cameras 20, the integral tracking unit 200 may perform object tracking on objects that are viewable to each camera 20 with high possibilities.

With reference to FIG. 6, the respective units of the integral tracking unit 200 will be described.

The memory unit 220 may store information related to trackers that are associated with objects (targets) included in the detection results received by the integral tracking unit 200. The information related to trackers stored in the memory unit 220 may be managed by the update unit 240 using the trackers' IDs. The information related to trackers may include information related to objects, tracking results related to the objects being included in the trackers, information related to parameters including the likelihoods of the trackers, and the like. In some embodiments, the information related to the trackers according to the present disclosure is not limited to the above. The information about the objects may include information indicating the past positions of the objects, information related to the motion models of the objects, and the like. In some embodiments, the information about the objects according to the present disclosure is not limited to the above. The information about the objects may include information included in the above-described object detection results.

The following descriptions will be made based on an example of the integral tracking unit 200 in which the memory unit 220 is embedded. In some embodiments, the memory unit 200 according to the present disclosure is not limited to the above. The memory unit 220 may be installed not in the integral tacking unit 200, but be installed in the object tracking apparatus 10 independently of the memory unit 220. In other aspects, the memory unit 220 may be realized by separate memory devices or the like other than the object tracking apparatus 10.

If the memory unit 220 is not embedded in the integral tracking unit 200, the memory unit 220 may be configured to store data and the like used in the object tracking apparatus 10. For example, the memory unit 220 may store camera videos captured by the cameras 20, camera parameters for the respective cameras 20, areas of coordinate values in the common coordinate system that are viewable to respective cameras 20, and the like.

The prediction unit 210 may predict the positions of objects on the current frame with reference to the memory unit 220. In some embodiments, the prediction unit 210 may predict the current positions of the objects on the basis of the motion models of the objects using the tracking results of the objects (trackers) on the previous frame. Information indicating the positions of the objects may be represented in the common coordinate system.

The motion models of the objects, which are used for estimating the positions by the prediction unit 210, may be motion models stored in the memory unit 220, or may be motion models calculated by the prediction unit 210 before the prediction unit 210 predicts the positions of the objects.

For the prediction of the positions of the objects performed by the prediction unit 210, prediction processing such as Kalman filter processing or particle filter processing may be applicable. In some embodiments, the prediction unit 210 may calculate the velocities of the objects from the several tracking results in past, predict movement amounts from the positions on the previous frame using the velocities under the assumption that the objects move at constant velocities, and predict the current positions by adding the movement amounts to the positions on the previous frame.

The prediction unit 210 may output the prediction results to the association unit 230.

The association unit 230 may receive detection results output from respective detection units 100. In FIG. 6, the detection result (n) (n may represent any of 1 to N) may represent a detection result output from the corresponding detection unit 100-*n*. The association unit 230 may receive the prediction results from the prediction unit 210. The association unit 230 may associate targets included in the detection results with trackers using the above-described prediction results with reference to the memory unit 220.

The association unit 230 may search for the combinations of the targets and the trackers that improve the accuracy of the entirety of the association processing. The likelihood that a target m and a tracker k is associated with each other may be the product of Pm, ηk, and qkm, where Pm is the likelihood of the target m, ηk is the likelihood of the tracker k, and qkm is the likelihood that represents the possibility that the target m and the tracker k is the same object. The association unit 230 may calculate the likelihood for correctly associating each pair of a target and a tracker, and search for the combinations of the targets and the trackers that improve the total accuracy of all the combinations.

The likelihood of a target may be a value representing reliability (e.g., accuracy) of object detection. An accuracy of object detection may depend on the size of an object of detection target (referred to as a detection object) on a screen (e.g., on a frame), a distance from a camera 20 to the detected position of the object, the appearance of the object from the camera 20, and the like.

For example, in the case where a detection object is so small that the size of the detection object can be detected by a narrow margin, the accuracy of the object detection may become lower. For example, in the case where the size of a detection object deviates from the apparent size of the object that can be assumed from camera parameters, the accuracy of the object detection may become lower. For example, if the detected position of an object is far from a camera 20 or if an illumination condition for an area within which the object exists is bad and it is therefore difficult to detect the object, the accuracy of the object detection may become lower. For example, if appearance indicated by data used for learning of a discriminator is different from actual appearance of the object (for example, viewing angles of both cases are different from each other), the accuracy of the object detection may become lower.

The association unit 230 may calculate the likelihood of a target in consideration of the above-described characteristics (conditions). In some embodiments, the association unit 230 may calculate the likelihood of the target using the target likelihood information included in the detection results received from the detection units 100. In a case where the detection units 100 calculate the likelihood of the target and includes the calculated likelihood into the detection results as the target likelihood information, the association unit 230 may use the likelihood included in the target likelihood information as it is. In some cases, in the calculation of the likelihood of the target, only some of the above-described items (conditions) are taken into consideration.

The likelihood of a tracker may be a value representing reliability (e.g., accuracy) of object tracking. An accuracy of object tracking may vary depending on the tracking result of object tracking on the previous frame. For example, in the tracking results for frames (e.g., past frames) before the current frame, a tracker that is associated with the corresponding target may have a high accuracy of object tracking. For example, a tracker that is not associated with the corresponding target may have a low accuracy of object tracking. Therefore, the association unit 230 may vary a likelihood on the basis of the result whether a target and a tracker have been associated with or not on each frame. In some embodiments, if the target and the tracker are associated with each other, the association unit 230 may increase the likelihood of the tracker, and if the target and the tracker are not associated with each other, the association unit 230 may decrease the likelihood of the tracker.

In some embodiments, if the position of the tracker is far from a camera 20, an error of the position of the tracker may increase. As a result, it may become difficult that such a tracker is associated with an object included in the detection results (e.g., a target). Therefore, the association unit 230 may vary a ratio, with which the likelihood of a tracker varies, in accordance with a distance between the position of the tracker and the camera 20. In some embodiments, the association unit 230 may vary a ratio, with which the likelihood of a tracker varies, in accordance with an angle formed by a horizontal plane including a camera 20 and the direction of the gaze to which an object whose tracking result is indicated by a tracker is viewed from the camera 20 (e.g., a depression angle or an elevation angle).

For example, in a case where an object whose tracking result is indicated by a tracker (hereinafter, referred to as a tracker's object) is near to a camera 20, and a depression angle of the camera 20 to the object is larger than a predetermined angle, the accuracy of the position of the object may be high. Therefore, the tracker and the target can be easily associated with each other. In this case, the association unit 230 may increase the ratio.

If a tracker's object is far from a camera 20, and a depression angle of the camera 20 to the object is smaller than a predetermined angle, the size of the object on a frame captured by the camera 20 may become small. Further, a little deviation on an image may become a large deviation in a real space. Therefore, there may be a high possibility that the accuracy of the detected position of this object becomes low. In this case, the association unit 230 may decrease the ratio. As described above, the association unit 230 may calculate the likelihood of a tracker.

As described above, because the association unit 230 can reflect a detection result obtained by a camera 20 nearer to a tracker's object in the likelihood of the tracker, the accuracy of tracking can be improved as a whole. In some cases, in the calculation of the likelihood of the tracker, only some of the above-described items are taken into consideration.

A likelihood qkm that represents the identity of a target m and a tracker k may represent a probability that both target m and tracker k are the same as each other. In the case where an object represented by a target and an object represented by a tracker's object are the same, there is a high possibility that the position of the target and the position of the tracker's object is near to each other. Therefore, the association unit 230 may vary the likelihood in accordance with the distance between a target and a tracker's object. In some embodiments, if the distance between the target m and the tracker's object is small, the association unit 230 may set the value of the likelihood qkm larger and if the distance is large, the association unit 230 may set the value of the likelihood qkm smaller.

In this case, if the target m is far from the camera 20, or if the depression angle of the camera 20 to the target m is smaller than a predetermined angle, there may be a high possibility that the detection accuracy of the position of the target m becomes low. Therefore, the association unit 230 may calculate the distance between a target and a tracker's object using, for example, a Mahalanobis distance which is calculated with an error (e.g., to reflect ambiguity) of the detected position of the target taken into consideration, rather than using a simple Euclidean distance. In some embodiments, the association unit 230 may adopt a method, in which the degree of change of the likelihood qkm is controlled in accordance with the distance in consideration of the ambiguity, instead of the above-described methods. In some embodiments, if the above ambiguity is large, the association unit 230 may set the change of the likelihood qkm smaller in accordance with the distance between the target m and the tracker's object. As described above, the association unit 230 can alleviate an adverse effect given to the association processing by the deviation of the position of a target.

The association unit 230 may take similarities in the appearances of a target and a tracker into consideration. In some embodiments, the association unit 230 may extract the features of the colors, patterns, and shapes of the target and the tracker's object in advance, and calculate the likelihood qkm by evaluating these similarities.

For example, the association unit 230 may calculate color histograms of the object for both the target and the tracker's object, evaluate similarity in these color histograms using the overlapped portion of the color histograms, and calculate the likelihood qkm in consideration of the similarity. As is the case with the likelihood ηk of the tracker and the likelihood Pm of the target, in some cases, in the calculation of the likelihood qkm that represents the identity of a target and a tracker, only some of the above-described items are taken into consideration.

The association unit 230 may calculate the above likelihoods taking into consideration the cases where the object gets outside the field of view of the camera 20, or the object cannot be detected because it is hidden by another object. As described above, even in a case where an object is not detected, or in a case where the object is outside the field angle of the camera 20, the integral tracking unit 200 can track the object with high accuracy.

As described above, a problem in which respective likelihoods are calculated and the associations of targets and trackers that make the respective likelihoods maximum as a whole are searched for can reduce to an allocation problem that makes a cost minimum by converting each of the likelihoods to a cost with a monotonically non-increasing function (e.g., a problem about which target should be associated with which tracker). This allocation problem can be efficiently solved using a method such as the Hungarian method, for example.

The association unit 230 may output the result of the association processing to the update unit 240. The result of the association processing may include information indicating the association between a target and a tracker, and the above-described respective likelihoods including at least information related to the likelihoods of trackers.

In the present example, the association unit 230 may have performed association processing using both likelihoods of targets and likelihoods of trackers. In some embodiments, the association unit 230 may perform association processing using the likelihoods of either targets or trackers.

The update unit 240 may update information related to trackers. The update unit 240 may generate these trackers as a new object tracking result. In some embodiments, the update unit 240 may receive the result of the association processing from the association unit 230. The update unit 240 may calculate the current position of the tracker's object on the basis of the result of the association processing. The update unit 240 may update the information related to trackers stored in the memory unit 220. Updated information may include, for example, information related to parameters such as the position and/or size of the object whose tracking information is included in the tracker, the motion model of the object, and the likelihood of the tracker. In the present disclosure, updated information may not be limited to the above. The update unit 240 may update the updated information among information stored in the memory unit 220.

The calculation of the current position of a tracker's object performed by the update unit 240 will be described. The update unit 240 may calculate the current position of the tracker's object taking the accuracy of the position of the corresponding target into consideration. For example, it is assumed that the update unit 240 calculates the current position of the tracker's object by weighing the predicted position of the object, which is predicted by the update unit 240 using the tracker, and the detected position of the target associated with the tracker. In this case, the update unit 240 may control the weights in accordance with the accuracy of the position of the target.

For example, if the target is far from a camera 20, and the depression angle of the camera 20 to the target is small, there may be a possibility that the accuracy of determining the position of this target is low. In such a case, the update unit 240 may set the weight for the position of the target smaller.

For example, if the target is near to the camera 20, and the depression angle of the camera 20 to the target is large, it may be expected that the accuracy of determining the position of this target is high. In such a case, the update unit 240 may set the weight for the position of the target larger.

The update unit 240 may calculate the current position of the tracker's object using the predicted position and the weighted position.

As described above, since the update unit 240 determines a weight for the position of the target, the detection result by a camera 20 near to the target can be more heavily weighted in the prediction of the detected position of the object. Therefore, the object tracking apparatus 10 can improve the prediction accuracy of the position of the object.

The update unit 240 may update the latest predicted position of the object included in information related to the object stored in the memory unit 220 with the calculated current position of the object.

The updating of the likelihood of a tracker performed by the update unit 240 will be described.

If a tracker's object is far from a camera 20, the size of the object may become small. Therefore, it may become difficult for a detection unit 100 to detect such an object.

In a case where the appearance of an object included in a frame is different from the appearance of an object used in learning, recognition-type object detection performed by a recognition-type object detection unit 111 of a detection unit 100 will be described. The case where the appearance of the object included in the frame is different from the appearance of the object used in learning may be, for example, a case where the depression angle of a camera 20 to the object, the depression angle being assumed from the position of the tracker's object, and the depression angle of the camera 20 to the object used in the learning are greatly different from each other. In such a case, it may become difficult for the recognition-type object detection unit 111 of the detection unit 100 to detect the object included in the frame.

In a case where it is difficult to detect the object, there may be a possibility that the object included in the frame remains undetected. In this case, there may be a possibility that there is no target that is associated with the tracker related to this object.

In some embodiments, the update unit 240 may reduce the variation of the likelihood of the tracker related to an object in a situation where it is difficult to detect of the object, among trackers not associated to any target.

In such a way, the update unit 240 may alleviate an adverse effect on tracking in a case where an object is difficult to detect, and can intensely reflect a detection result obtained by a camera, using which the object is easily detected, in the likelihood of the corresponding tracker. In tracking of the object on the next frame, because the association unit 230 performs association on the basis of this likelihood of the tracker, the integral tracking unit 200 can greatly improve the accuracy of the object tracking.

The update unit 240 may update the likelihood of the tracker calculated by the association unit 230 and the likelihood of the tracker, the variation of which is reduced, among the likelihoods of trackers stored in the memory unit 220.

The update of the motion model of a tracker's object performed by the update unit 240 will be described. For example, a case where the integral tracking unit 200 performs object tracking by estimating the position of an object using a Kalman filter will be described. In this case, the update unit 240 may update the state of the Kalman filter by substituting the position coordinate values of a tracker's object associated with a target for the update expression of the state variable of the Kalman filter, which is stored in the memory unit 220, as a detected position coordinate value.

In some embodiments, besides the above updating, the update unit 240 may update other parameters of the tracker and the like stored in the memory unit 220.

For example, there may be a case where an object itself changes its posture. For example, if an object is a person, when the person crouches down or bends down, the apparent height of the person may change. As described above, when not only the motion model of the object but also the size of the object or the like changes, the update unit 240 may update information related to the changes among information stored in the memory unit 220.

In some embodiments, if parameters of the tracker include weights which represent a probability that a tracker's object exists, reliability of a tracking result, and the like, the weights may vary in accordance with the result of association processing performed by the association unit 230. Therefore, the update unit 240 may update parameters such as these weights.

The update unit 240 may generate a tracker or delete a tracker as part of tracker update processing. After the association processing by the association unit 230, the update unit 240 may determine whether there is a target that is not associated with any tracker. There may be a possibility that the target, which is not associated with any tracker, is an object that has newly appeared within an area that the corresponding camera 20 can capture. Therefore, if there is a target that is not associated with any tracker, the update unit 240 may determine whether this target can be regarded as an object that has newly appeared within the area or not.

In some embodiments, if there is a target that is not associated with any tracker, the update unit 240 may evaluate a probability that this target exists. In this case, the update unit 240 may determine whether this probability is equal to or more than a predetermined value or not. If this probability is equal to or more than the predetermined value, the update unit 240 may determine that this target is an object that has newly appeared within the area. The update unit 240 may generate a tracker related to the object (e.g., target) that is determined to be an object that has newly appeared within the area.

In some embodiments, the update unit 240 may determine whether there is a tracker that is not associated with any target. There may be a possibility that the tracker that is not associated with any target is a tracker related to an object that has disappeared from an area that the corresponding camera 20 can capture (e.g., an object that has moved from the inside of the area to the outside of the area). Therefore, if there is a tracker that is not associated with any target, the update unit 240 may determine whether or not this tracker can be regarded as a tracker related to an object that has disappeared from the inside of the area.

In some embodiments, if there is a tracker that is not associated with any target, the update unit 240 may evaluate a probability that an object related to this tracker exists. The update unit 240 may determine whether this probability is smaller than a predetermined value or not. If this probability is smaller than the predetermined value, the update unit 240 may determine that the object related to this tracker is an object that has disappeared from the inside of the area. The update unit 240 may delete the tracker related to the object that is determined to have disappeared from the inside of the area.

A probability that an object exists may be calculated from the likelihood of the corresponding tracker. In some embodiments, if there is a tracker that is not associated with any target, the update unit 240 may decrease the likelihood of this tracker. If the value of the likelihood of the tracker gets smaller than a predetermined threshold, the update unit 240 may delete the tracker.

The update unit 240 may generate a tracking result on this frame with trackers that exist to the end. The update unit 240 may output, for example, information indicating the positions of trackers, the sizes of trackers' objects, and the like among these trackers as information indicating the tracking result of object tracking (tracking information).

As described above, with the object tracking apparatus 10 according to embodiments of the present disclosure, object tracking may be performed on camera images output from respective cameras 20 in a chronological order corresponding to time information included the camera videos. Objects detected from respective video data of the plurality of cameras 20 may be detected by integrating detection results with high accuracy for the respective cameras 20, and by using tracking results in which the integrated detection result(s) and past tracking results are reflected. Therefore, the tracking accuracy of object tracking performed by the integral tracking unit 200 of the object tracking apparatus 10 can be improved.

Figure 8:
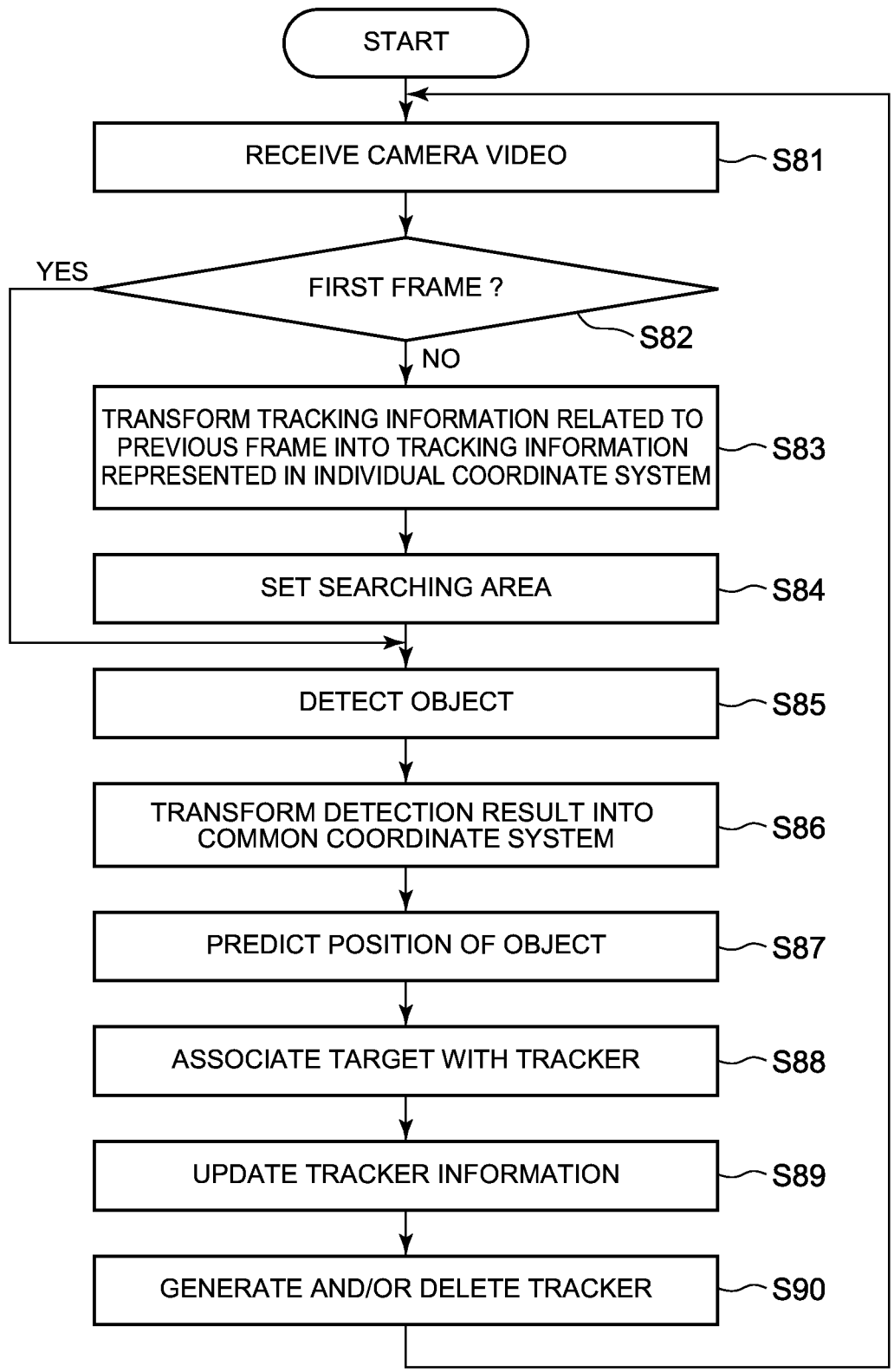
FIG. 8 is a flowchart illustrating an example of an object tracking method according to embodiments of the present disclosure.

An example of flow of object tracking processing of the object tracking apparatus 10 according to the embodiments of the present disclosure will be described with reference to FIG. 8. FIG. 8 is a flowchart illustrating an example of an object tracking processing method according to embodiments of the present disclosure. In some embodiments, the processing method can be performed by object tracking apparatus 10 of FIG. 2.

As illustrated in FIG. 8, in step S81, a recognition-type object detection unit 111 of a detection unit 100 may receive a camera video from a camera 20 that is associated with the detection unit 100 including the corresponding object detection unit 110.

In step S82, the detection unit 100 may check whether or not the frame of the received camera video is the first frame output from the camera 20. If the frame is the first frame ("YES" in step S82), the flow may advance to step S85.

If the frame of the received camera video is not the first frame ("NO" in step S82), in step S83, the corresponding individual coordinate transformation unit 130 of the detection unit 100 may transform tracking information related to the previous frame output from the integral tracking unit 200 into tracking information represented in the individual coordinate system.

In step S84, the searching area setting unit 112 of the object detection unit 110 included in the detection unit 100 may set a searching area for an object on the current frame using the tracking information transformed in step S83.

In step S85, the recognition-type object detection unit 111 of the detection unit 100 may detect the object from the received camera video.

In step S86, the individual coordinate transformation unit 130 of the detection unit 100 may transform the detection result detected by the recognition-type object detection unit 111 into a detection result represented in the common coordinate system.

In step S87, the prediction unit 210 of the corresponding integral tracking unit 200 may predict the position of the object on the current frame using tracker information.

In step S88, the association unit 230 of the integral tracking unit 200 may associate an object (e.g., a target) included in the detection result with a tracker.

In step S89, the update unit 240 of the integral tracking unit 200 may update tracker information related to the position of the tracker's object, the motion model of the object, and the like.

In step S90, the update unit 240 of the corresponding integral tracking unit 200 may generate and/or delete a tracker. The object tracking apparatus 10 may repeat this processing until any frame is not input into the detection unit 100.

Advantageous Effect

As described above, in the object tracking apparatus 10 according to the embodiments of the present disclosure, an object can be tracked with a higher accuracy. This may be because a detection unit 100 detects an object from output information of a camera 20 on the basis of tracking information related to the output information before the corresponding output information (e.g., the frame of the corresponding video). Further, this may be because the integral tracking unit 200 tracks the object on the basis of plurality of detection results output by the respective detection units 100, and generates tracking information of the object represented in the common coordinate system.

For example, if there is an object that is not viewable to a first camera 20 but viewable to a second camera 20, the object tracking apparatus 10 may use the tracking result of the object that is not viewable to the first camera 20 for object detection related to a video of this first camera 20. In this case, when this object appears within an area that is viewable to the first camera 20, the corresponding detection unit 100 can appropriately detect this object. Therefore, the object tracking apparatus 10 can perform the tracking of this object with high accuracy.

For at least these reasons, the object tracking apparatus 10 can raise the accuracy of object detection in comparison with a case where the tracking result related to the previous frame is not used. Because the object tracking apparatus 10 performs object tracking using the detection results from a plurality of detection units, the accuracy of tracking results may also be improved as a whole.

As described above, the object tracking apparatus 10 according to embodiments of the present disclosure can extract the trajectory of a person or the like moving across areas that are captured by individuals of plurality of cameras 20. Therefore, the tracking result obtained by the object tracking apparatus 10 can be used as fundamental information for marketing or for changing the layout of a shop by analyzing the action of a customer who moves round the inside of a shop. In some embodiments, this tracking result can be used for detecting a person who hangs around across the areas for security reasons.

In some embodiments, because a searching area setting unit 112 sets a searching area for object detection in a camera video using a tracking result, a recognition-type object detection unit 111 can reduce superfluous erroneous detection. In other aspects, the recognition-type object detection unit 111 can speed up object detection processing.

In some embodiments, because the integral tracking unit 200 performs object tracking using the likelihoods of targets and/or the likelihoods of trackers, the object tracking apparatus 10 can obtain a more reliable object tracking result. In other aspects, because the object tracking apparatus 10 performs object detection using the object tracking result obtained in such a way, the accuracy of object tracking can be improved. Therefore, the object tracking apparatus 10 can improve the accuracy of object tracking as a whole.

Second Example

A second example will be described with reference to the accompanying drawings. Components having the same functions as the functions of components included in the drawings described in the first example will be given the same reference symbols.

An object tracking system 2 according to embodiments of the present disclosure may have a configuration including an object tracking apparatus 50 instead of the object tracking apparatus 10 of the object tracking system 1 according to the first example described using FIG. 2. Other parts of the configuration of the object tracking system 2 may be the same as those of the object tracking system 1 illustrated in FIG. 2.

(Object Tracking Apparatus 50)

Figure 9:
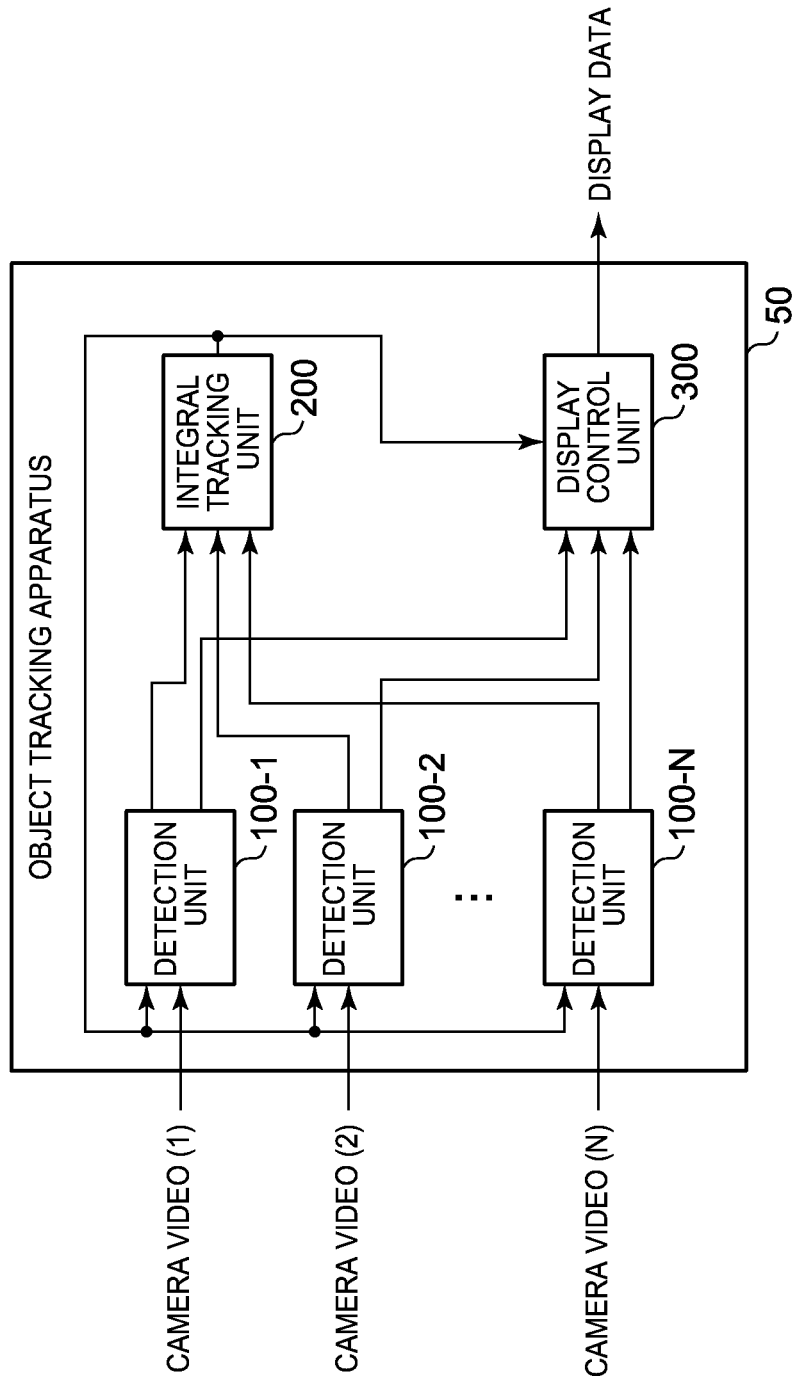
FIG. 9 is a block diagram illustrating an example of an object tracking apparatus according to embodiments of the present disclosure.

The functions of the object tracking apparatus 50 will be described with reference to FIG. 9. FIG. 9 is a block diagram illustrating an example of an object tracking apparatus 50 according to embodiments of the present disclosure. As illustrated in FIG. 9, the object tracking apparatus 50 may include a plurality of detection units (100-1 to 100-N), an integral tracking unit 200, and a display control unit 300. As is the case with the above-described first example, in the present example, the plurality detection units (100-1 to 100-N) may be referred to collectively as detection units 100.

The display control unit 300 may control images (e.g., extracted from the videos) to be displayed on a display device 30. In some embodiments, the display control unit 300 may generate display data, which is transformed into data displayable on the display device 30, from tracking information output from the integral tracking unit 200, and transmit the display data to the display device 30. The tracking information output from the integral tracking unit 200 may be represented in a common coordinate system. In some embodiments, the display control unit 300 may generate display data that is transformed into data displayable on the display device 30 in the common coordinate system.

In this case, the integral tracking unit 200 may output information for the flow lines of objects to be displayed on the display device 30 (for example, information indicating the past positions of trackers' objects) to the display control unit 300 as tracking information. This tracking information may be either the same as or different from information to be provided to the detection units 100.

The display device 30 may display the received display data on its screen. As described above, the object tracking apparatus 50 can provide a tracking result to a user.

A detection unit 100 of the object tracking apparatus 50 according to the present example may generate display data, which is obtained by transforming a searching area set by the searching area setting unit 112 of the corresponding object detection unit 110 into data displayable on the display device 30, and transmit the display data to the display device 30. Searching area information output by the searching area setting unit 112 may be represented in the individual coordinate system of the camera 20. In some embodiments, the display control device 300 may generate display data displayable in the corresponding individual coordinate system on the display device 30 using camera parameters of a camera 20 associated with the detection unit 100 that outputs the searching area information.

The display device 30 may display the received display data on its screen. As described above, the object tracking apparatus 50 can provide the searching area to the user using the searching area information of the corresponding object output from each detection unit 100.

In some embodiments, there may be a plurality of display devices 30. For example, a combination of two display devices can be configured in such a way that one display device 30 receives display data represented in the common coordinate system, and the other display device 30 receives display data represented in individual coordinate systems, and respective display devices 30 display the display data they receive on their screen. In other aspects, one display region of a display device 30 may be divided into a plurality of sub-regions, and the display data may be divided among the plurality of sub-regions for displaying. As described above, the data display method of the display device 30 according to the present example may not be limited to a specific method.

Figure 10:
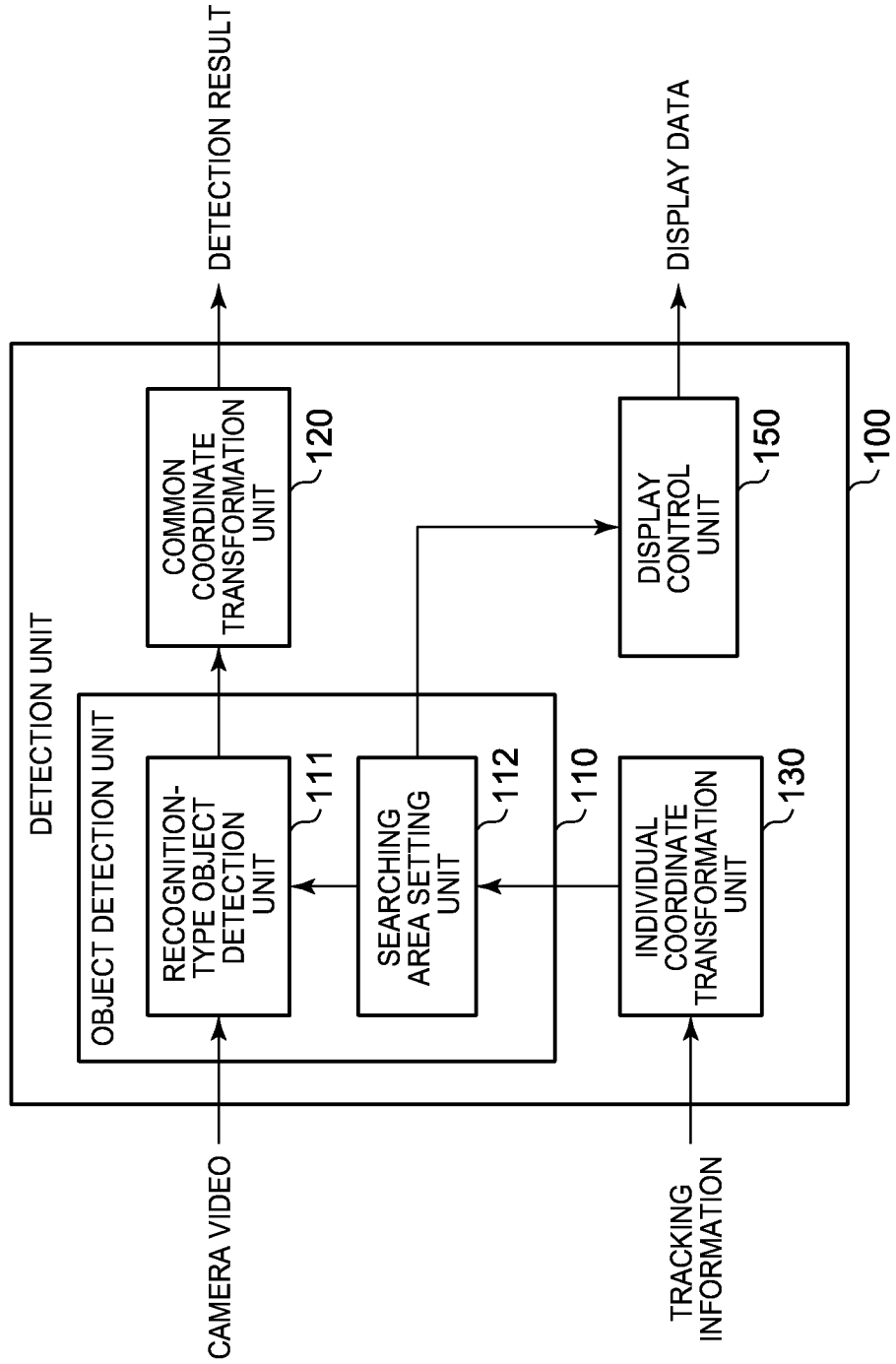
FIG. 10 is a block diagram illustrating an example of a detection unit of an object tracking apparatus according to embodiments of the present disclosure.

In some embodiments, the display control unit 300 may be configured to be included in each detection unit 100. FIG. 10 is a block diagram indicating an example of a detection unit 100 of the object tracking apparatus 50 according to an illustrative embodiment. As illustrated in FIG. 10, the detection unit 100 may include an object detection unit 110, a common coordinate transformation unit 120, an individual coordinate transformation unit 130, and a display control unit 150. In some embodiments, the object detection unit 110 may include a recognition-type object detection unit 111, and a searching area setting unit 112 as is the case with the object detection unit 110 illustrated in FIG. 5.

The searching area setting unit 112 illustrated in FIG. 10 may output searching area information indicating a set searching area to the display control unit 150. The display control unit 150 may generate display data that is transformed into data displayable on the display device 30 in the common coordinate system as is the case with the display control unit 300. The searching area information output by the searching area setting unit 112 may be represented in the individual coordinate system. In some embodiments, the display control unit 150 may generate display data displayable in the individual coordinate system on the display device 30 using camera parameters of a camera 20 associated with the detection unit 100 that includes the display control unit 150.

The display control unit 150 may transmit the generated display data to the display device 30. The display device 30 may display the received display data on its screen.

Application Example

An application example of the object tracking apparatus 50 according to embodiments of the present disclosure will be described with reference to FIGS. 11 to 14. FIGS. 11 to 14 are diagrams illustrating application examples of the object tracking apparatus 50 according to embodiments of the present disclosure.

Figure 11:
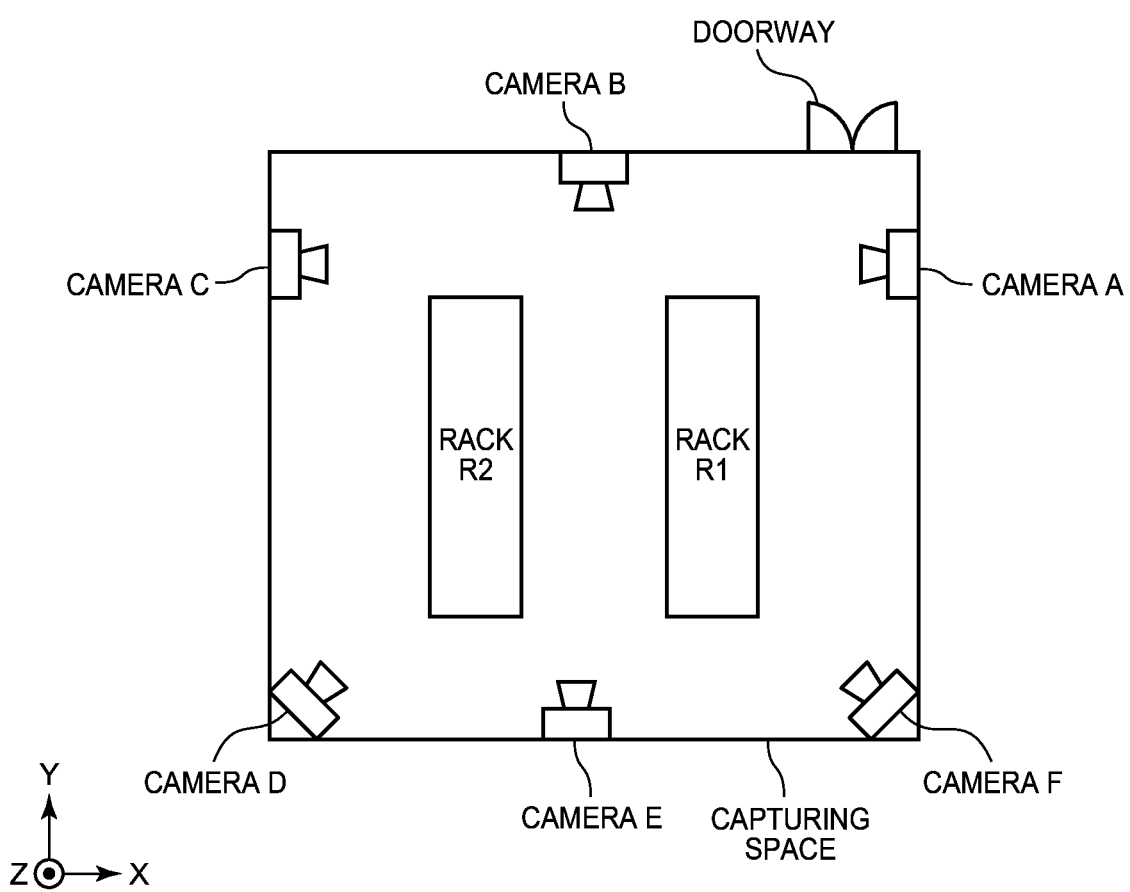
FIG. 11 is a schematic diagram illustrating an example of an application of an object tracking apparatus according to embodiments of the present disclosure.

FIG. 11 is a diagram illustrating an example of the interior of a room in which a rack R1, a rack R2, and plurality of cameras (A to F) are installed and in which is viewed from a direction opposite to the direction of gravitational force. As illustrated in FIG. 11, the lateral direction of FIG. 11 is set to the X-axis in the common coordinate system, and the longitudinal direction of FIG. 11 is set to the Y-axis. The rack R1 and the rack R2 may be installed on the X-axis in such a way that the longitudinal directions of the rack R1 and the rack R2 are in parallel with the Y-axis.

The camera A may be installed in the position near to the doorway of the room. In this example, it is assumed that all the parts of the interior of the room can be captured by any of the cameras A to F. In some embodiments, as illustrated in FIG. 11, the space of the interior of the room in which the plurality of cameras (A to F) are installed may include a capturing space. In some embodiments, the cameras A to F may capture a space common to all the cameras.

FIG. 12 is a diagram illustrating two figures that represent, respectively, an example of a video captured by the camera A and an example of an image captured by the camera B. The upper figure in FIG. 12 can be a figure illustrating a certain frame of a video captured by the camera A. The lower figure in FIG. 12 can be a figure illustrating a frame of a video captured by the camera B. Coordinate values in these frames may be represented by coordinate values in an individual coordinate system for each camera.

In some embodiments, the object tracking apparatus 50 according to the embodiments of the present disclosure may be configured in such a way that videos captured by the cameras 20 are displayed on the display device 30.

As illustrated in FIG. 12, the video captured by the camera A may include a person C1. Because the camera A is installed near to the doorway, this video may include the doorway. The video captured by the camera B may include the person C1 and a person C2.

The person C2 may be hidden by the rack R1 viewed from the camera A. Therefore, at the time when the videos in FIG. 12 are captured, the person C2 may be an object not viewable to the camera A. If these frames of the videos are respectively a frame of the first video captured by the camera A and a frame of the first image captured by the camera B, there are no preceding frames from any cameras. Thus, there may be no tracking information related to the previous frame before each frame. In some embodiments, the object tracking apparatus 50 may detect objects from these frames, and generate tracking information.

The searching area setting unit 112 may set a searching area for an object on the next frame of the video captured by the camera A using tracking information represented in the individual coordinate system. The searching area setting unit 112 may set a searching area for an object on the next frame of the video captured by the camera B using tracking information represented in the individual coordinate system.

Figure 13:
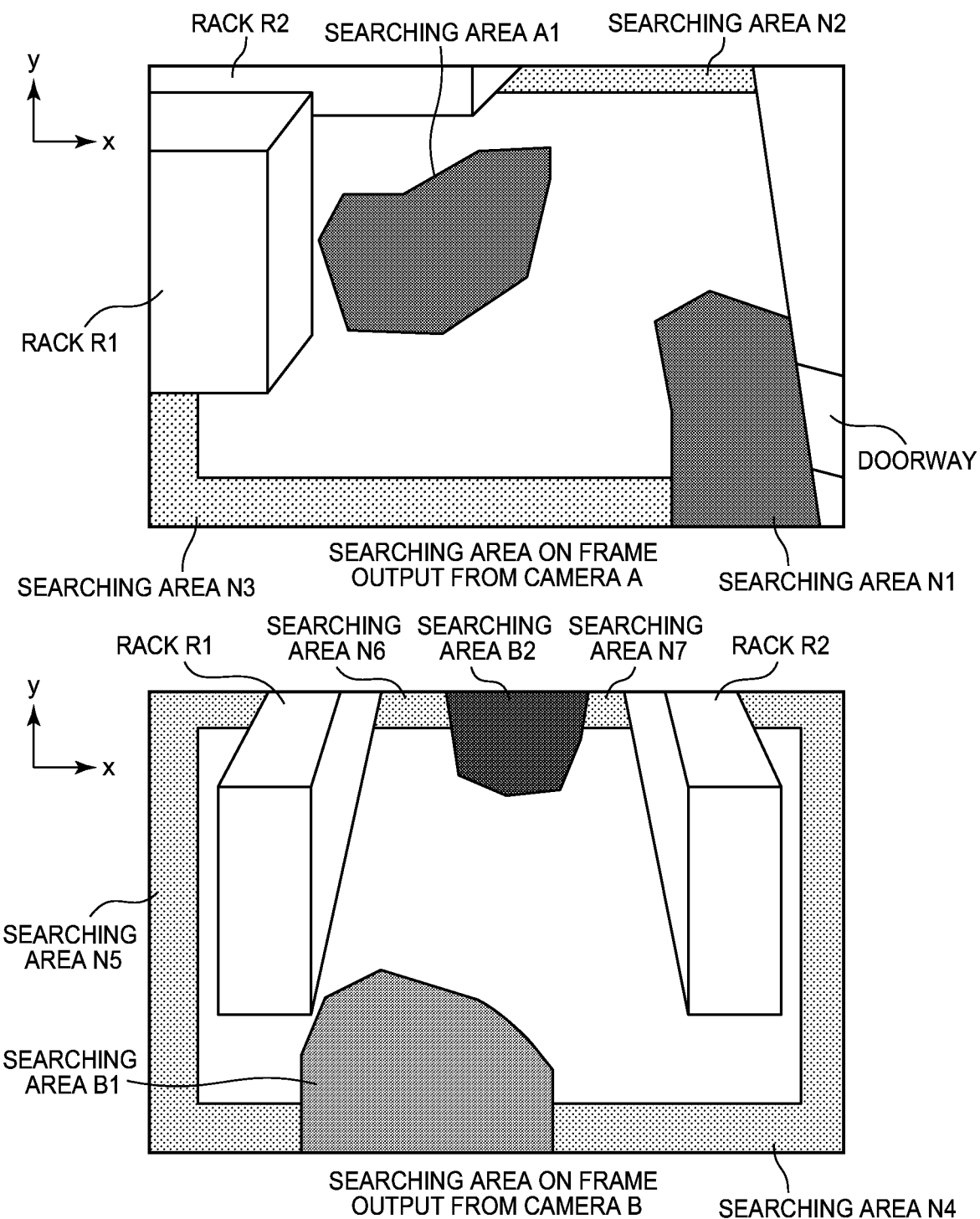
FIG. 13 is a schematic diagram illustrating an example of an application of an object tracking apparatus according to embodiments of the present disclosure.

FIG. 13 is a diagram illustrating some examples of searching areas displayed on the display device 30. The upper figure in FIG. 13 may be examples illustrating searching areas for objects on a frame output from the camera A, and the lower figure in FIG. 13 may be examples illustrating searching areas for objects on a frame output from the camera B.

As illustrated in the upper figure in FIG. 13, the searching area setting unit 112 may obtain a searching area A1 with reference to the position of the person C1 in the upper figure in FIG. 12. The searching area setting unit 112 may obtain an area in the vicinity of the doorway leading to the interior of the room as a searching area N1. The searching area setting unit 112 may obtain two outer sides of the frame as searching areas N2 and N3. The searching area setting unit 112 may output information including searching areas A1, N1 to N3 to the recognition-type object detection unit 111, and the display control unit 150 or the display control unit 300 as searching area information. The display control unit 150 or the display control unit 300 may transform a searching area indicated by this searching area information into display data displayable on the screen of the display device 30, and transmit the display data to the display device 30.

The display device 30, which receives the display data from the display control device 150 or the display control device 300, may display the searching area on its screen as illustrated in the upper figure in FIG. 13.

The lower figure in FIG. 13 will be described. As illustrated in the lower figure in FIG. 13, the searching area setting unit 112 may obtain a searching area B1 and a searching area B2 respectively with reference to the position of the person C1 and the position of the person C2 in the lower figure in FIG. 12. The searching area setting unit 112 may obtain four outer sides of the frame as searching areas N4 to N7. The searching area setting unit 112 may output information including searching areas B1, B2, N4 to N7 to the recognition-type object detection unit 111, and the display control unit 150 or the display control unit 300 as searching area information. The display control unit 150 or the display control unit 300 may transform a searching area indicated by this searching area information into display data displayable on the screen of the display device 30, and transmit the display data to the display device 30.

The display device 30, which receives the display data from the display control device 150 or the display control device 300, may display the searching area on its screen as illustrated in the lower figure in FIG. 13.

In some embodiments, the display device 30 can display the sub-areas of the searching area in different respective modes. For example, the display device 30 may display the sub-area of the searching area that have been already detected and the sub-area of the searching area related to outer sides of a frame in different respective colors.

The integral tracking unit 200 may generate trackers related to the person C1 and the person C2 who are detected on the subsequent frames. The integral tracking unit 200 may output information for displaying the respective trajectories of the person C1 and the person C2 to the display control unit 300 as tracking information.

The display control unit 300 that receives the tracking information from the integral tracking unit 200 may transform the tracking information into display data that is displayable on the display device 30, and transmit the transformed display data to the display device 30.

Figure 14:
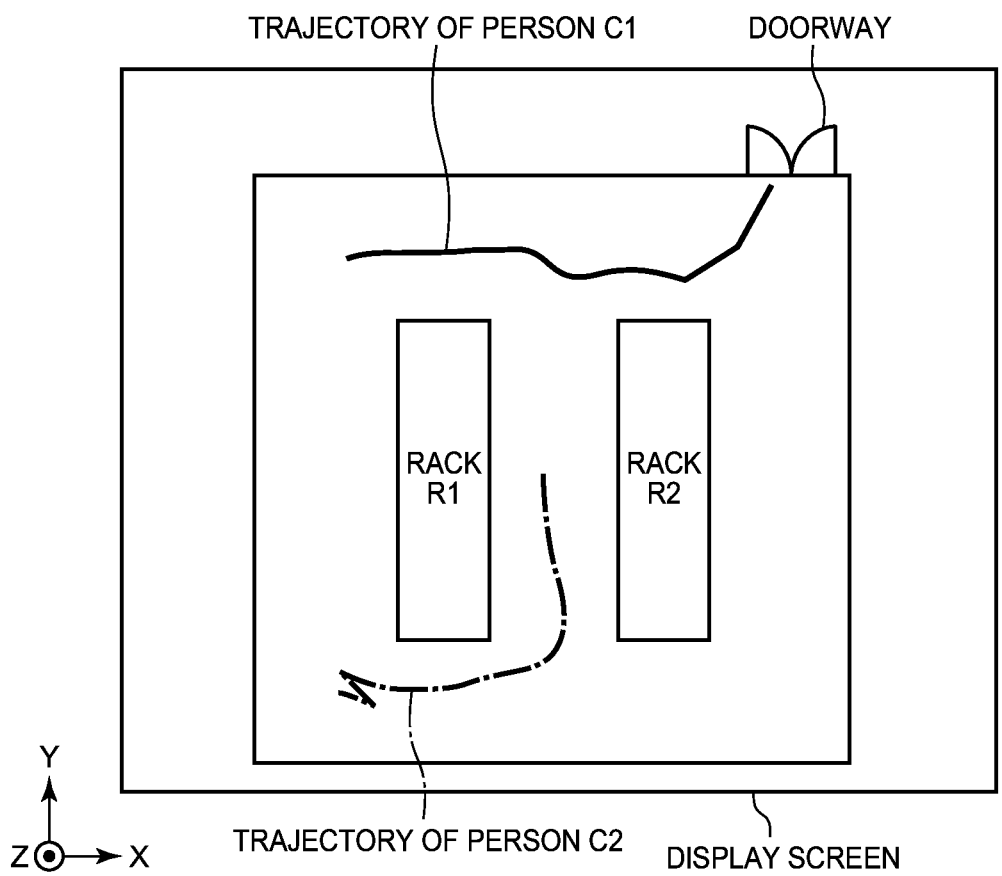
FIG. 14 is a schematic diagram illustrating an example of an application of an object tracking apparatus according to embodiments of the present disclosure.

The display device 30 may display the display data received from the display control unit 300 on its screen. FIG. 14 is a figure illustrating an example of the trajectories indicating the respective tracking results of the person C1 and the person C2 that the display device 30 displays on its screen (display screen). As illustrated in FIG. 14, it is assumed that the tracking result of an object is displayed on the X-Y plane in the common coordinate system in this application example. In FIG. 14, the trajectory of the person C1 is depicted by a solid line, and the trajectory of the person C2 is depicted by a one-dot chain line. In this way, the display device 30 can display the tracking results of objects on its screen.

Third Example

A third example will be described with reference to the accompanying drawings. Components having the same functions as the functions of components included in the drawings described in the first example and the second example will be given the same reference symbols.

Figure 15:
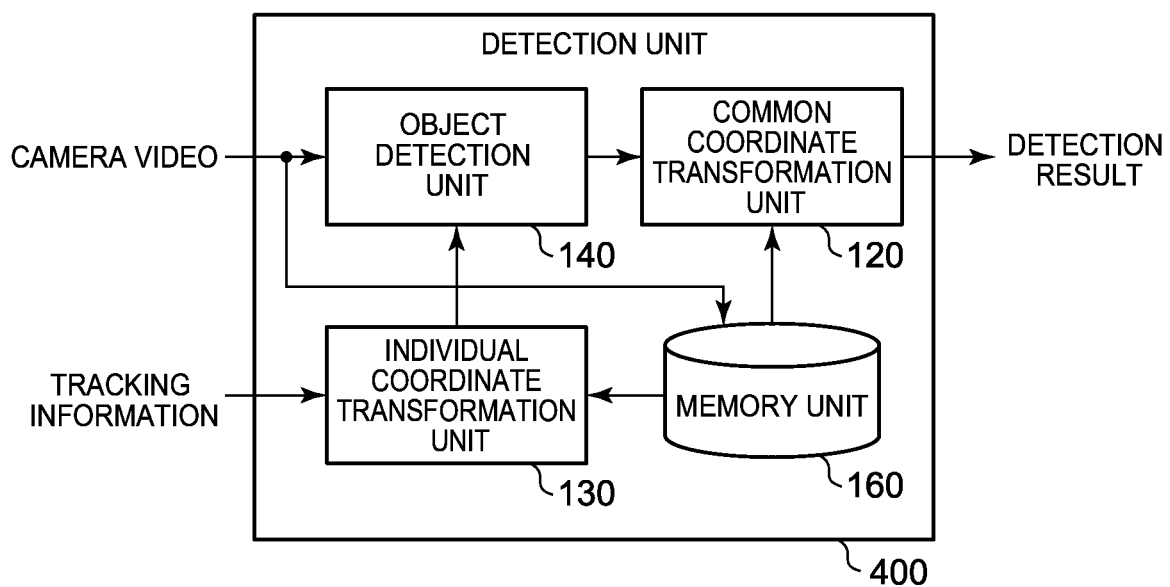
FIG. 15 is a block diagram illustrating an example of a detection unit of an object tracking apparatus according to embodiments of the present disclosure.

An object tracking apparatus 10 according to embodiments of the present disclosure includes detection units 400 instead of the detection units 100 of the object tracking apparatus 10 illustrated in FIG. 1. The configuration of this detection unit 400 will be described with reference to FIG. 15. FIG. 15 is a block diagram illustrating an example of a detection unit 400 of the object tracking apparatus 10 according to an illustrative embodiment.

The detection unit 400 may include an object detection unit 140 instead of the object detection unit 110 of the detection unit 100 illustrated in FIG. 4 and FIG. 5. In some embodiments, the detection unit 400 may include a memory unit 160. In other aspects, the detection unit 400 according to the embodiments of the present disclosure may include the object detection unit 140, a common coordinate transformation unit 120, an individual coordinate transformation unit 130, and the memory unit 160.

In this example, the object tracking apparatus 10 is configured to include the object detection units 140 instead of the object detection units 110 of the detection units 100 of the object tracking apparatus 10 according to the first example. The present disclosure is not limited to the above configuration, and the configuration of the object tracking apparatus 10 according to the present example can include the object detection units 140 instead of the object detection units 110 of the detection units 100 of the object tracking apparatus 50 according to the second example. In some embodiments, the detection unit 100 according to the present example can be configured to output data to be displayed to the display control unit 150 or to the display control unit 300.

The memory unit 160 may store camera parameters for each camera 20 that are used in transformation between the coordinate systems. In some embodiments, the memory unit 160 may store information indicating the range of coordinate values in the common coordinate system that is used for the individual coordinate transformation unit 130 to check whether or not coordinate values in the common coordinate system included in tracking information is within an area that can be captured by the corresponding camera 20. The memory unit 160 may store a video that is captured by the camera 20. This video may be temporarily stored.

As illustrated in FIG. 15, the following description will be made assuming that the memory unit 16 is embedded in the detection unit 400. The present disclosure may not be limited to this configuration. The memory unit 160 may be installed in the object tracking apparatus 10 independently of the detection unit 400. In some embodiments, the memory unit 160 may be realized by a separate memory device or the like independently of the object tracking apparatus 10.

Figure 16:
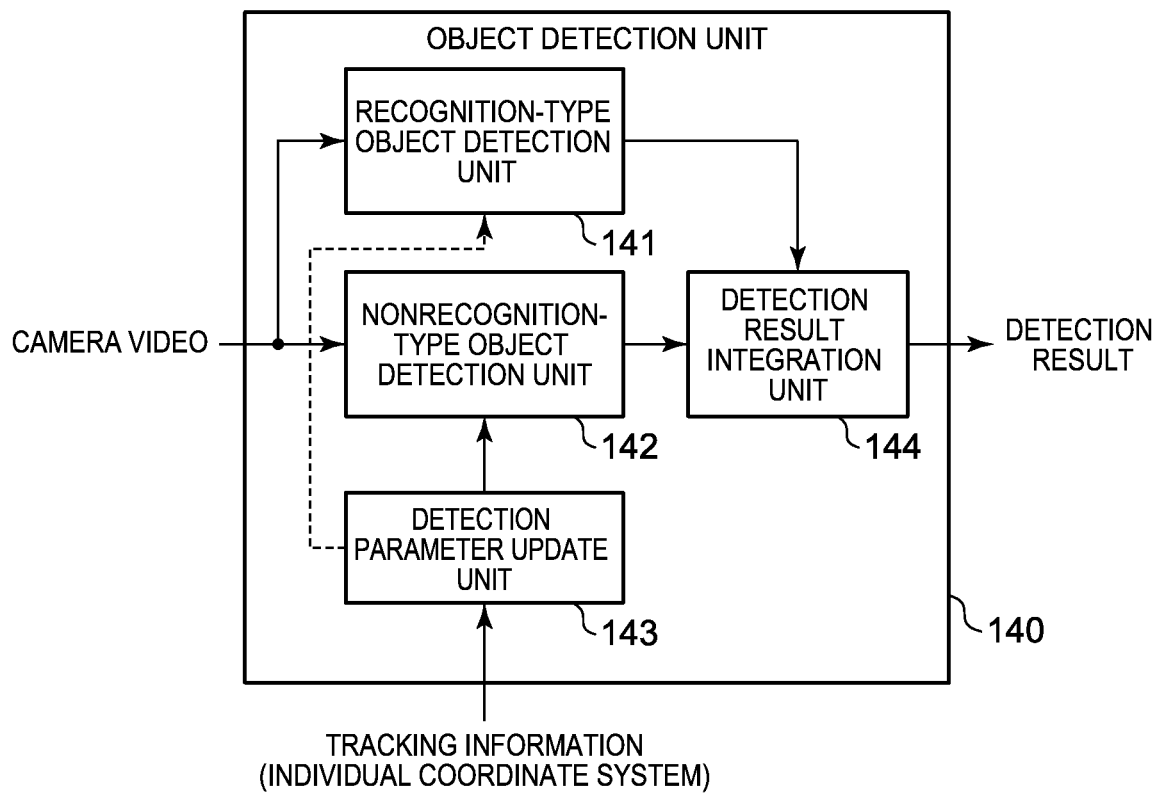
FIG. 16 is a block diagram illustrating an example of an object detection unit of the detection unit of an object tracking apparatus according to embodiments of the present disclosure.

The detailed functional configuration of the object detection unit 140 of the detection unit 400 will be described with reference to FIG. 16. FIG. 16 is a functional block diagram illustrating an example of the functional configuration of the object detection unit 140 of the detection unit 400 according to an illustrative embodiment. As illustrated in FIG. 16, the object detection unit 140 may include a recognition-type object detection unit 141, a nonrecognition-type object detection unit 142, a detection parameter update unit 143, and a detection result integration unit 144.

In this example, object detection that uses a dictionary (e.g., a discriminator) may be referred to as "recognition-type object detection". In this example, object detection that does not use a discriminator may be referred to as "nonrecognition-type object detection".

The recognition-type object detection unit 141 may detect objects from a camera video input into the recognition-type object detection unit 141. The recognition-type object detection unit 141 may perform object detection on the entirety of a frame. As depicted by a dashed line, the recognition-type detection unit 141 may perform object detection on the basis of searching area information output from the detection parameter update unit 143 as described below. In this case, the recognition-type object detection unit 141 may perform object detection in the same way as the recognition-type object detection unit 111 described in the first example does.

In a case where the searching area information is not output from the detection parameter update unit 143, the recognition-type object detection unit 141 may not perform object detection on the entirety of a frame, but perform object detection on the basis of another criterion. For example, the recognition-type object detection unit 141 may perform object detection in an area within which the silhouette of an object exists and the surrounding area of the area using the silhouette information of the object.

The recognition-type object detection unit 141 may output the detection result of the object detection to the detection result integration unit 144 as a first detection result.

The recognition-type object detection unit 141 may extract the appearance features of the object at this time in preparation for the below-described nonrecognition-type object detection unit 142 to perform object detection. The appearance features of an object may include information related to the color, pattern, and shape of the object. The present disclosure may not be limited to the above information. The recognition-type object detection unit 141 may extract these features as the appearance features of the object. In this case, it may not be always necessary that an area used for object detection performed by the recognition-type object detection unit 141 is the same as an area used for object detection performed by the nonrecognition-type object detection unit 142. For example, if an object is a person, it is assumed that the recognition-type object detection unit 141 detects the head of the person, and the nonrecognition-type object detection unit 142 detects the head to the area of the clothes of the person. In this case, the recognition-type object detection unit 141 may extract appearance features of the object from an area including the area of the clothes of the person. The recognition-type object detection unit 141 may output the extracted features as template information as well as information indicating an area used for the extraction. In some embodiments, the recognition-type object detection unit 141 may store the features themselves, and output information for identifying the features.

The detection parameter update unit 143 may receive tracking information represented in the individual coordinate system from the individual coordinate transformation unit 130. The detection parameter update unit 143 may obtain parameters for object detection (hereinafter referred to as detection parameters) using this information. These detection parameters may be parameters necessary for object detection processing. The detection parameters may include, for example, the predicted position of an object on the current frame, a searching area to which object detection is applied, the size of a template used for template matching, the features of the template of a target associated with a tracker in the past, etc. The detection parameters may exclude some of the above information, and the detection parameters may include parameters for object detection performed by the nonrecognition-type object detection unit 142. The detection parameters may include information of a target associated with a tracker in the tracking result of the object on the previous frame.

For example, the detection parameter update unit 143 may obtain the position at which an object exists on the current frame as a predicted position on the basis of the tracking information of the object that is a target (e.g., an object detected on the previous frame) and associated with a tracker. This prediction processing may be performed in a similar way to the prediction processing of a predicted position performed by the searching area setting unit 112 according to the first example. The detection parameter update unit 143 may obtain an area including this predicted position as a prediction area.

For example, the detection parameter update unit 143 may obtain an area to which object detection by template matching is applied with the above prediction area as the center of the area, and include this area into the searching area of the object included in the detection parameters.

The detection parameter update unit 143 may obtain the detection parameters for respective objects included in tracking information. The detection parameter update unit 143 may update the obtained detection parameters as detection parameters used for object detection processing. The detection parameter update unit 143 may output these detection parameters to the nonrecognition-type object detection unit 142.

The detection parameter update unit 143 may obtain the searching area of an object using tracking information transformed into coordinate values in the individual coordinate system as is the case with the above-described searching area setting unit 112 of the detection unit 100 according to the first example. The detection parameter update unit 143 may output searching area information indicating the obtained searching area of the object to the recognition-type object detection unit 141.

The nonrecognition-type object detection unit 142 may receive the detection parameters from the detection parameter update unit 143. The nonrecognition-type object detection unit 142 may detect an object from a camera video input into the nonrecognition-type object detection unit 142 on the basis of the received detection parameters. This nonrecognition-type object detection unit 142 may perform object detection on the basis of the similarity of the appearance of the object detected on the previous frame unlike the recognition-type object detection unit 141.

In some embodiments, when an object is detected on the previous frame, the nonrecognition-type object detection unit 142 may store the image features of the region of the object (or a partial image of the detection region itself) as a template. The nonrecognition-type object detection unit 142 may perform object detection by checking whether a region similar to this stored template exists on the current frame or not using template matching. The image features used in this case may be, for example, features indicated by information related to a color pattern and a color distribution, information related to an edge distribution and a luminance gradient distribution, or a combination of some of the above information.

The detection parameters used when the nonrecognition-type object detection unit 142 performs object detection may be controlled by detection parameters output from the detection parameter update unit 143. In some embodiments, the nonrecognition-type object detection unit 142 may perform object detection by performing template matching on the predicted position of an object, which is predicted by the detection parameter update unit 143, and its vicinity. In other aspects, the nonrecognition-type object detection unit 142 may set the searching area of template matching with its center set to a predicted object existence area, and perform template matching on its vicinity. In this case, the nonrecognition-type object detection unit 142 may take into consideration that the apparent size of an object changes in accordance with the displacement of the position of the object. This change may be calculated using camera parameters. In some embodiments, after calculating the change of the size of the object, and reflecting the change in the template, the nonrecognition-type object detection unit 142 may perform template matching.

Information of the template used by the nonrecognition-type object detection unit 142 for template matching may be information related to the features extracted by the recognition-type object detection unit 141 in the object detection processing on the previous frame.

As describe above, because the nonrecognition-type object detection unit 142 performs object detection on the basis of the tracking results of an objects that are tracked by the integral tracking unit 200, the nonrecognition-type object detection unit 142 can improve the accuracy of object detection in comparison with a case where the above tracking results are not used.

The nonrecognition-type object detection unit 142 may output the detection result of the object detection to the detection result integration unit 144 as a second detection result.

The detection result integration unit 144 may receive the first detection result from the recognition-type object detection unit 141. The detection result integration unit 144 may receive the second detection result from the nonrecognition-type object detection unit 142. The detection result integration unit 144 may integrate the first detection result and the second detection result. The detection result integration unit 144 may output the integrated result to the common coordinate transformation unit 120 as the detection result of the object detection performed by the object detection unit 140.

There may be some objects that are included both in the first detection result and in the second detection result, and others may be included either in the first detection result or in the second detection result. In some embodiments, the detection result integration unit 144 may integrate the first detection result and the second detection result by associating objects included in the first detection result with objects in the second detection result. In this association, the degree of overlap among object regions may be used.

In some embodiments, the detection result integration unit 144 may calculate an overlap ratio between the object regions of respective two objects (for example, an overlap ratio between the object circumscribing rectangles related to the two objects), and if the overlap ratio is larger than a predetermined value, the object included in the first detection result and the object included in the second detection result may be associated with each other.

The detection result integration unit 144 may associate any two objects with each other based on a formula that calculates a weight based on an overlap ratio between the object regions of the two objects. For example, after transforming the overlap ratio into a cost using a monotonically nonincreasing function, the detection result integration unit 144 may associate the two objects with each other by calculating an optimal association using a Hungarian method or the like.

As a result of the association, if the values used for the association (for example, the overlap ratio or the cost) are larger than a predetermined value, the detection result integration unit 144 may integrate the corresponding first detection result and the corresponding second detection result at this moment. In some embodiments, without integrating the corresponding first detection result and the corresponding second detection result at this moment, the detection result integration unit 144 may generate information indicating that the respective two objects are associated with each other. As a result, after making a detection result by combining the first detection result and the second detection result and adding the information, which indicates that the association can be made, to the detection result, the detection result integration unit 144 may output the detection result as the detection result of the object detection unit 140, and perform tracking using information related to the association when integral tracking is performed.

The nonrecognition-type object detection unit 142 may output a second detection result on the basis of the tracking result of an object on the previous frame. In some embodiments, there may be a case where the second detection result is generated later than the corresponding first detection result is generated. In such a case, the detection integration unit 144 may temporarily store the first detection result in a memory region such as a buffer in the detection integration unit 144 or in the memory unit 160. At the time when the detection result integration unit 144 receives a second detection result related to a frame corresponding to a frame related to which the first detection result is generated, the detection result integration unit 144 may integrate both results.

As described above, the detection unit 400 of the object tracking apparatus 10 according to embodiments of the present disclosure may output the result of integration of the result of object detection performed by the recognition-type object detection unit 141 and the result of object detection performed by the nonrecognition-type object detection unit 142 as a detection result. In this case, the nonrecognition-type object detection unit 142 may detect an object by performing template matching on the basis of the tracking result of objects tracked by the integral tracking unit 200. As described above, the detection unit 400 can improve the accuracy of object detection in comparison with a case where object detection is performed only by recognizing an object (recognizing-type object detection).

Therefore, the object tracking apparatus 10 can perform object tracking more accurately.

Fourth Example

A fourth example will be described with the accompanying drawings. Components having the same functions as the functions of components included in the drawings described in the above-described examples will be given the same reference symbols.

Figure 17:
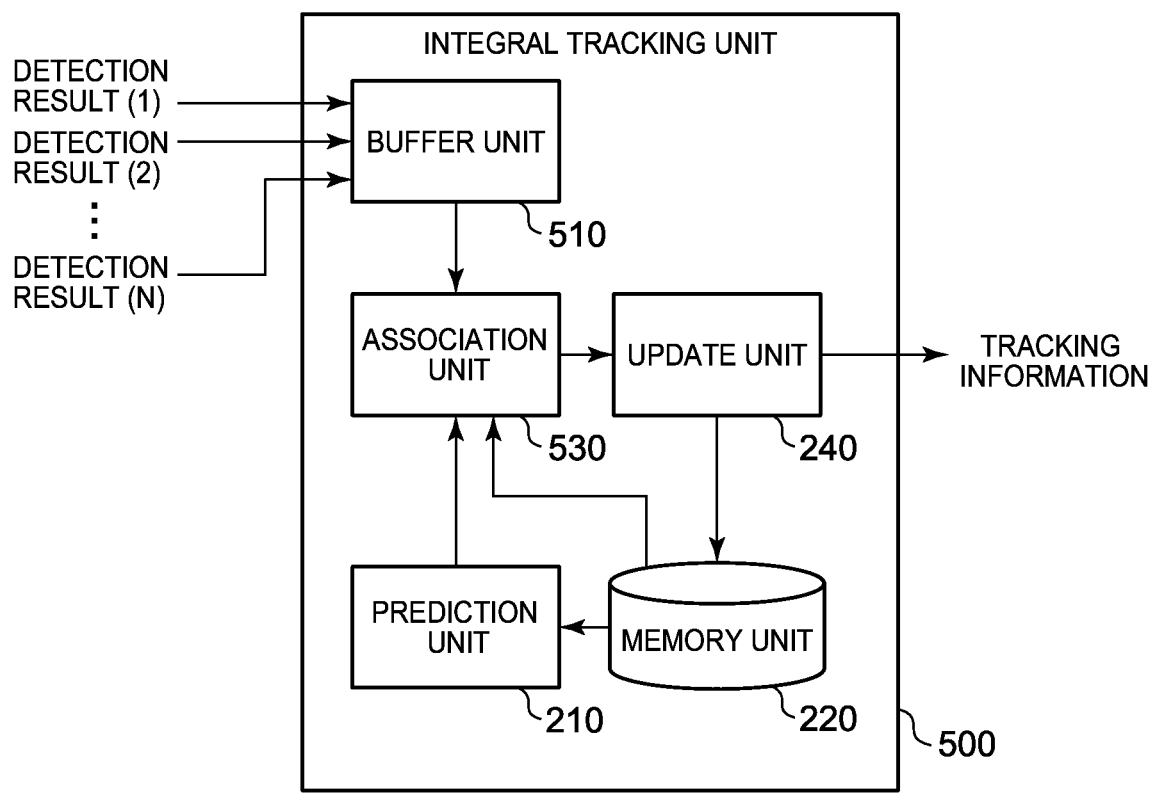
FIG. 17 is a block diagram illustrating an example of an integral tracking unit of an object tracking apparatus according to embodiments of the present disclosure.

An object tracking apparatus 10 according to embodiments of the present disclosure may have a configuration including an integral tracking unit 500 instead of the integral tracking unit 200 of the object tracking apparatus 10 illustrated in FIG. 1. The configuration of this integral tracking unit 500 will be described with reference to FIG. 17. FIG. 17 is a block diagram illustrating an example of an integral tracking unit 500 of the object tracking apparatus 10 according to embodiments of the present disclosure. As illustrated in FIG. 17, the integral tracking unit 500 may include a buffer unit 510, a prediction unit 210, a memory unit 220, an association unit 530, and an update unit 240.

The present example will be described assuming that the object tracking apparatus 10 according to embodiments of the present disclosure is configured to include the integral tracking unit 500 instead of the integral tracking unit 200 of the object tracking apparatus 10 according to the first example. The present disclosure may not be limited to the above configuration, and the configuration of the object tracking apparatus 10 according to the embodiments of the present disclosure may include the integral tracking unit 500 instead of the integral tracking unit 200 of the object tracking apparatus 50 according to the second example. In some embodiments, the integral tracking unit 500 may be configured to output data to be displayed to a display control unit 300.

In some embodiments, a detection unit that outputs a detection result to the integral tracking unit 500 in this example may be the detection unit 400 described in the third example.

The buffer unit 510 may be a storage section that temporarily stores a detection result that is output from a detection unit 100 and represented in a common coordinate system. Among data (e.g., detection results) buffered in the buffer unit 510, data which is detected from camera videos including time information indicating times within a predetermined time period may be obtained by the association unit 530. This predetermined time period may be a cyclic time period. The association unit 530 may perform object tracking using one or more detection results obtained in a certain cycle. In this way, because the integral tracking unit 500 performs object tracking using a plurality of camera videos among videos captured by respective cameras 20, the integral tracking unit 500 may also be referred to as a batch tracking unit.

Figure 18:
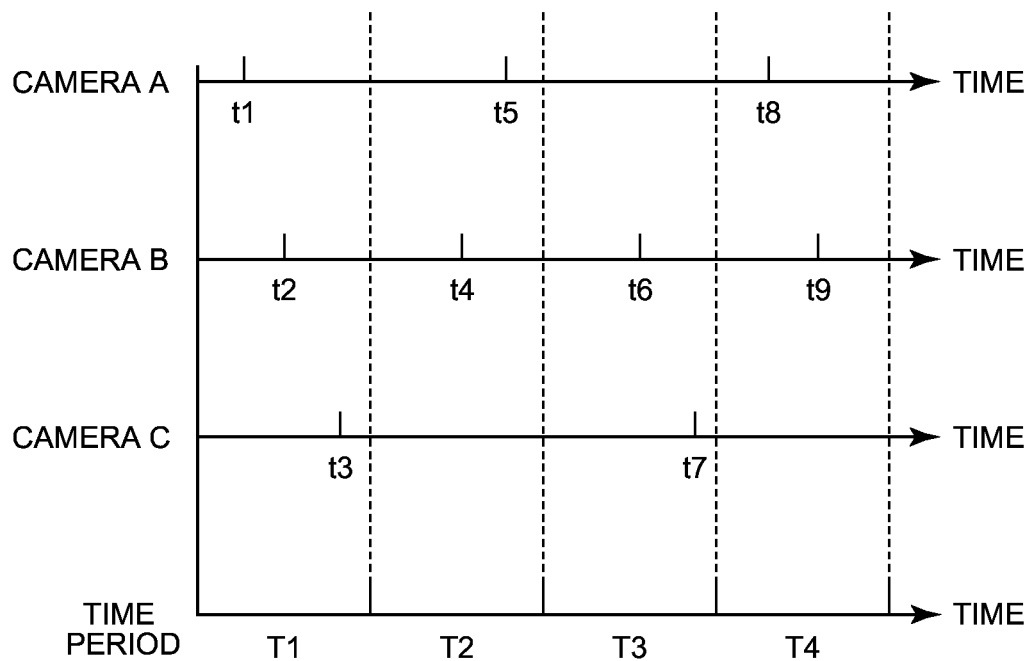
FIG. 18 is a diagram describing an example of an object batch tracking processing performed by an example of an object tracking apparatus according to embodiments of the present disclosure.

The object tracking (hereinafter referred to as batch integral tracking) performed by this integral tracking unit 500 will be described with reference to FIG. 18. FIG. 18 is a diagram describing object batch tracking processing according to embodiments of the present disclosure. In some embodiments, the batch integral tracking of FIG. 18 can be performed by integral tracking unit 500. As is the case with FIG. 7, FIG. 18 may be an example illustrating timing at which each of a camera A, a camera B, and a camera C (of cameras 20) obtains an image in the case where the number of cameras is three. In FIG. 18, each of horizontal axes is a time axis and the righter a time point is located along the time axis, the later time the time point indicates. As illustrated in FIG. 18, it is assumed that the camera A obtains images at the time t1, t5, and t8. Similarly, it is assumed that the camera B obtains images at the time t2, t4, t6, and t9, and that the camera C obtains images at the time t3, and t7.

Object detection may be performed on the images obtained at these respective timings in chronological order. The following explanation will be made under the assumption that the times illustrated in FIG. 18 are almost equal to times at which the corresponding detection results of objects are output. In other words, it is assumed that the time t1 is a time at which a detection result related to a frame of a video captured by the camera A is output from the detection unit 100 and at which the detection result is buffered in the buffer unit 510.

The lowermost time axis in FIG. 18 is an example illustrating a cyclic time period.

The association unit 530 may obtain a detection result, which is detected from a camera video including time information indicating a time within a predetermined time period, among one or plurality of detection results buffered in the buffer unit 510. As described above, this predetermined time period may be a cyclic time period. In this example, it is assumed that the time when one or plurality of detection results are buffered is equal to the time when the respective camera videos are captured. In some embodiments, the association unit 530 may obtain one or plurality of buffered detection results at a predetermined cycle.

In some embodiments, the association unit 530 may obtain detection results buffered during the first time period T1. In other words, the association unit 530 may obtain detection results buffered at the times t1, t2, and t3. A detection result buffered at the time t1 may be a detection result related to a frame of a video captured by the camera A. A detection result buffered at the time t2 may be a detection result related to a frame of a video captured by the camera B, and a detection result buffered at the time t3 may be a detection result related to a frame of a video captured by the camera C. In some embodiments, the association unit 530 may obtain a plurality of detection results, which are buffered in the buffer unit 510 during a predetermined time period (in this case, during the time period T1) and which are detection results related to frames of respective videos captured by individuals of the plurality of cameras 20, from the buffer unit 510. The association unit 530 may perform object tracking using the obtained detection results.

During the time periods T2, T3, and T4, the association unit 530 may perform object tracking using detection results obtained during these cyclic time periods in the same way as above.

The configuration of the present example is described under the assumption that the association unit 530 obtains data (e.g., the plurality of detection results), which are buffered in the buffer unit 510, at a predetermined time period. In some embodiments, the association unit 530 may be configured to receive these data from the buffer unit 510 at a predetermined time period. In other words, the buffer unit 510 may transmit these data to the association unit 530 at a predetermined time period.

With reference to FIG. 17, the association unit 530 of the integral tracking unit 500 will be described.

The association unit 530 may obtain distances among targets included in the obtained detection results using the positions of the targets, and associate two targets, the distance between which is short, with each other. At this time, the association unit 530 may perform association using the distances among the targets by means of a Hungarian method or the like. In some embodiments, the association unit 530 may use the similarity in the appearance features of the targets in addition to the distances among the targets. For example, there may be a high possibility that two targets whose positions are near to each other and whose colors are similar to each other correspond to the same object. Therefore, the association unit 530 may perform association using such features. The types of features for determining the similarity in the appearance features may not be limited to the colors of targets, and the types of features may be the patterns of targets and the like.

The association unit 530 may integrate the detection results corresponding to the targets that are associated with each other. In some embodiments, after associating the targets with each other, the association unit 530 may obtain the position of the corresponding object using respective detection results corresponding to the targets associated with each other. At this time, the association unit 530 may evaluate the likelihood and/or the accuracy of the predicted position of each target, and set the position, which makes this accuracy maximum, to the position of the corresponding object.

The association unit 530 may weigh the position of each target on the basis of the accuracy of predicted position determined by an angle (e.g., a depression angle or an elevation angle) of the corresponding camera 20 to the target, a distance from the camera 20 to each target, and the like. The association unit 530 may calculate a statistic value such as an average value from the weighted position, and set the position indicated by the calculated statistic value to the position of the object.

The association unit 530 may set the obtained position of the object to the position of the target related to a cycle in which the corresponding detection result is obtained. The association unit 530 may perform association using the position of this target as is the case with the association unit 230 according to the first example. The association processing and the subsequent processing are the same as those performed by the integral tracking unit 200 described in the first example.

Before performing association among targets, the association unit 530 may associate targets with trackers, and the association unit 530 may integrate the detection results corresponding to respective associated targets. In some embodiments, if there are plurality of targets associated with the same tracker, the association unit 530 may associate these targets with each other. In this case, the association unit 530 may perform association while taking into consideration the likelihoods and/or accuracy of the predicted positions of respective targets. In such a way, the association unit 530 may evaluate detection results on the basis of the information, and may integrate the detection results corresponding to respective associated targets associated with the same tracker.

As described above, the object tracking apparatus 10 according to the present example may perform object tracking using all detection results related to camera videos captured by respective cameras 20 during predetermined time periods. As a result, it may become possible that the object tracking apparatus 10 easily performs object tracking processing in which the detection results of objects are given priority.

If the frame rates of all the cameras 20 are steady and the same, it may become possible to include the frames of all the cameras 20 in a predetermined time period by appropriately setting the predetermined time period in consideration of the frame intervals. Therefore, the object tracking apparatus 10 according to the present example can perform object tracking on the frames related to all the cameras 20. As a result, because the object tracking apparatus 10 can evaluate at the same time the detection results related to objects that are all together viewable to the plurality of cameras 20, it may become possible that the reliability of the detection results is directly reflected by tracking.

Fifth Example

A fifth example according to the present disclosure will be described. In this explanation of the present example, the minimum configuration that solves the problem of this invention will be described.

Because an object tracking apparatus 10 according to the present example has a configuration similar to the configuration of the object tracking apparatus 10 that has been described in the first example and illustrated in FIG. 1, the object tracking apparatus 10 according to the present example will be described with reference to FIG. 1.

As illustrated in FIG. 1, the object tracking apparatus 10 according to the present example may include a plurality of detection unit (100-1 to 100-N) and an integral tracking unit 200. In the present example, the plurality of detection units (100-1 to 100-N) may be referred to as detection units 100.

Each of the plurality of detection units 100 may detect objects from output information output from the corresponding sensor. The sensors are described as cameras and output information of the sensors is described as camera videos. In some embodiments, the sensors may not be limited to cameras. In some instances, each detection unit 100 may detect objects on the basis of tracking information output from the integral tracking unit 200. The detection unit 100 may output the detection result to the integral tracking unit 200.

The integral tracking unit 200 may track one or more objects indicated by the plurality of detection results on the basis of the detection results output by individuals of the plurality of detection units (100-1 to 100-N). The integral tracking unit 200 may generate tracking information of the objects represented in the common coordinate system. The integral tracking unit 200 may output the tracking information to individuals of the plurality of detection units (100-1 to 100-N).

As described above, the detection units 100 of the object tracking apparatus 10 according to the present example may detect objects from the output information output from the sensors on the basis of the tracking results of objects that are tracked by the integral tracking unit 200.

As described above, because the object tracking apparatus 10 detects objects from videos using the tracking result related to the previous frame, the object tracking apparatus 10 can raise the accuracy of object detection higher in comparison with a case where the tracking result related to the previous frame is not used. Because object tracking is performed using all the object detection results related to videos captured by individuals of the cameras 20, the object tracking apparatus 10 can improve the accuracy of tracking in comparison with a case where object tracking is independently performed for each camera. Because the object tracking apparatus 10 performs object tracking using the detection results from a plurality of detection units, objects can be tracked more accurately.

In the above examples, descriptions have been made under the assumption that the object tracking apparatus 10 includes detection units (100 or 400) and the integral tracking unit (200 or 500). In some embodiments, these detection units and integral tracking unit may be respectively realized in separate devices. In some embodiments, the detection units (100 or 400) may be realized as object detection devices by separate devices, and the integral tracking unit (200 or 500) may be realized as an integral tracking device by a separate device. In some embodiments, the display control unit 300 may be realized as a separate display control device independently of the object tracking apparatus 50. In other aspects, this display control device may be embedded in the display device 30.

Sixth Example

A sixth example will be described below. Because the configuration of an object tracking apparatus 10 according to the present example is similar to that of the object tracking apparatus 10 that is described and illustrated in FIG. 1 in the first example, the object tracking apparatus 10 according to the present example will be described with reference to FIG. 1. The object tracking apparatus 10 according to the present example may include functions that will be described as follows in addition to the functions of the object tracking apparatus 10 according to the first example. In some embodiments, the present disclosure may not be limited to this. The function of the object tracking apparatus 10 according to the present example may have the object tracking apparatuses according to the above-described second to fifth example.

In the present example, an integral tracking unit 200 may obtain information related to the appearances of respective objects, and this obtained information may be added to the tracking information related to the respective objects. The detection units 100 may control the object detection using the information that is included in the tracking information output from the integral tracking unit 200 and that is related to the appearances of the respective objects.

This information related to the appearances of the respective objects (hereinafter, referred to as appearance information) may be information related to the appearance of the respective objects when the respective objects are viewed from the positions of the respective cameras 20, and this information may be determined by the positions of the objects of respective trackers.

For example, there is a case where, when a certain object and another object are viewed from a certain camera 20, the certain object is located in front of the other object (e.g., being closer to the certain camera 20). In such a case, there may be a high possibility that the rear object (the other object) is overlapped by the front object (the certain object), and that the rear object (the other object) becomes not viewable from the certain camera 20. In some instances, the integral tracking unit 200 may add information indicating such an overlapping state between these objects as appearance information to a tracker related to the other object, and output the tracking result.

An example of an operation of the respective units of the object tracking apparatus 10 according to the present example will be described.

The integral tracking unit 200 may store information related to the dispositions of the respective cameras 20, for example, in a memory unit 220 illustrated in FIG. 6 or the like. The information related to the dispositions of the respective cameras 20 may include, for example, information indicating positions in which the respective cameras 20 are disposed, directions which are captured by the respective cameras 20, and the like. The integral tracking unit 200 may include information related to illumination conditions such as the position and direction of an illumination in a capturing space, the characteristics of the illumination, and well-lighted areas or low-lighted areas in the capturing space as information related to the dispositions of the respective cameras 20. The integral tracking unit 200 may store information related to the direction of the capturing space as the information related to the dispositions of the respective cameras 20.

As is the case with the integral tracking units 200 according to the above-described exemplary embodiments, the integral tracking unit 200 may predict the motions of the objects on the current frame indicated by the respective trackers, and associate targets with the respective trackers, and the integral tracking unit 200 may obtain the positions of the trackers.

The integral tracking unit 200 may predict the positions of objects which are indicated by the respective trackers on captured images captured by the respective cameras 20, using the obtained positions of the trackers and information related to the motion of the trackers.

The integral tracking unit 200 may predict the appearance of each object located in its predicted position from each of the respective cameras 20 (appearance) with reference to information related to the dispositions of the cameras 20. In some embodiments, the integral tracking unit 200 may estimate whether or not there will be an overlapping among the objects indicated by each of the above-described respective trackers for each of the plurality of cameras 20 in the timing at which the next capturing is performed.

In a case where the integral tracking unit 200 determines that there is an overlapping among objects on an captured image captured by a certain camera 20 on the basis of the predicted appearance, the integral tracking unit 200 may generate information indicating there is a possibility that some object is overlapped and becomes not viewable (appearance information) owing to the overlapping.

For example, when there is a certain camera 20 and a certain predicted object, the integral tracking unit 200 may determine whether or not there is another estimated object on a line segment between the certain camera 20 and the certain predicted object. If there is another predicted object on the line segment between the certain camera 20 and the certain predicted object, there may be a high possibility that this certain object is overlapped by the other object. In some embodiments, the integral tracking unit 200 may obtain information related to this overlapped object and the degree of overlap as appearance information related to the certain object.

The integral tracking unit 200 may add this determination result to the tracking result of this certain object as the appearance information.

The integral tracking unit 200 may add the generated appearance information to the tracking information of the object that is likely to disappear from the captured image captured by the certain camera 20. In this case, information indicating a camera 20, which captures an image including an object likely to be not viewable, may be added to the appearance information.

The integral tracking unit 200 may send the tracking information including the appearance information to the respective detection units 100. In some embodiments, the integral tracking unit 200 may send the tracking information including the appearance information to a detection unit 100 corresponding to a camera 20 (e.g., a certain camera 20) that captures an image including an object likely to be unviewable owing to overlapping among objects. The integral tracking unit 200 may send the tracking information not including the appearance information to the detection unit 100 corresponding to other cameras 20.

If it is known that the way an illumination is cast on an object varies in accordance with the position of the object so that the color and brightness of the object vary, the integral tracking unit 200 may add information that describes the way the appearance of the object varies in accordance with the position of the object, to the tracking information.

For example, if the way the illumination is cast on an object varies in accordance with the position of the object, the integral tracking unit 200 may predict the way the illumination is cast determining from the position of the object, and may add information, which describes the way the object is brightened, darkened, or its color changes, to the tracking information for the corresponding tracker.

For example, if the position of an illumination in a space where an object is disposed is known, the integral tracking unit 200 may determine whether or not the shadows of the other objects or the shadows of all other things disposed in this environment overlap the object using the relation between the illumination and the object. If there is a possibility that these shadows overlap the object, the integral tracking unit 200 may calculate overlapping possibility related to the object that are overlapped by any of these shadows, and may add the overlapping possibility to the corresponding tracking information.

In some embodiments, even if an illumination is moving such as the sun, the integral tracking unit 200 may obtain the position of the sun determining from information related to the time and the direction of the sun from the site (e.g., the position of the corresponding camera 20), predict a direction in which a shadow is made, and take the influence of the shadow exerted on the appearance of the object into consideration. For example, the integral tracking unit 200 may obtain the current position of the sun from the time information, and estimate the direction in which a shadow is made with reference to the current position of the sun as well as the information related to the direction of the sun from the site. In some embodiments, if there is a possibility that the shadows of the other objects overlap, the integral tracking unit 200 may calculate the possibility (likelihood) of overlapping of the object and the shadows of the other objects, and add the possibility to the tracking information.

The operation of a detection unit 100 will be described. As is the case with the detection units of the above-described exemplary embodiments, the detection unit 100 may detect objects on the basis of the tracking information. In this case, the detection unit 100 of the object tracking apparatus 10 according to the present exemplary embodiment may control the detection of objects using information related to the appearances of the respective objects included in the tracking information. In some embodiments, the detection unit 100 may not perform detection on an object likely to be unviewable owing to the overlapping of other objects. For example, the detection unit 100 may not set a searching area for this object likely to be unviewable.

If information related to the changes of brightness and color is included in the tracking information, the detection unit 100 may perform detection after correcting the effect of the corresponding illumination in searching. For example, in a dark area, the detection unit 100 may perform detection after setting the pixel values in the area brighter.

In a case where the color of an object changes, when the detection unit 100 updates a matching parameter used for template matching (e.g., one of the above-described detection parameters), the detection unit 100 may correct color information included in the parameter taking the change of the color into consideration. If the color of an object greatly changes, the detection unit 100 may not use the color information. In some embodiments, the detection unit 100 may lower the weight of the color information and raise the weights of other features such as an edge among the features of the template.

When the detection parameters used for object detection processing is updated by the detection unit 100, if it is determined there is a high possibility that the object is overlapped, the detection unit 100 may not update the detection parameter.

As described above, the detection unit 100 may control the detection of an object on the basis of the appearance information included in the tracking information. As described above, the detection unit 100 can omit the detection processing of an unviewable object and the update processing of parameters for template matching and the like.

This can reduce a possibility that the detection unit 100 performs erroneous detection or an erroneous update of the parameters.

In a similar way, if there is a high possibility that an illumination condition changes, the detection unit 100 can control so that the parameters are updated after the effect of the illumination is corrected, or the parameters are not updated.

If a detection unit 100 is configured to be able to switch detection algorithms (e.g., detecting an entire head, detecting a part of the head, etc.) as described below, the object tracking apparatus 10 may use a detector having more robustness to the overlappings of objects as the detection unit 100. In some embodiments, the object tracking apparatus 10 may use a detector that detects an entire head. In some embodiments, in a case where there is an overlapping, the object tracking apparatus 10 may use a detector that detects a part of the head. In such a way, the object tracking apparatus 10 may usually use a simple detector, and if there is a possibility of an overlapping, the object tracking apparatus 10 can use a more elaborate detector. Therefore, the object tracking apparatus 10 can perform more precise detection while maintaining efficiency. In a similar way, if an illumination condition changes, the object tracking apparatus 10 can control detection using a detector whose robustness against the illumination condition is high (a feature).

As described above, in the object tracking apparatus 10 according to the present exemplary embodiment, the integral tracking unit 200 may determine the appearance of an object using not only information from the corresponding camera but also information from other cameras. Therefore, even in a case where a certain camera 20 cannot make a correct determination such as a case where objects overlap each other when viewed from the certain camera 20, the integral tracking unit 200 may determine more precisely the appearances of the respective objects. The integral tracking unit 200 may provide this result to the detection unit 100. This can reduce a possibility that the detection unit 100 performs erroneous detection. Because the integral tracking unit 200 performs object tracking using this result, the precision of the object tracking can be improved.

In the above exemplary embodiments, descriptions have been made under the assumption that the object tracking apparatus 10 includes detection units (100 or 400) and the integral tracking unit (200 or 500). In some embodiments, these detection units and integral tracking unit may be realized in respective separate devices. In other aspects, the detection units (100 or 400) may be realized as object detection devices by separate devices, and the integral tracking unit (200 or 500) may be realized as an integral tracking device by a separate device. In other aspects, the display control unit 300 may be realized as a separate display control device independently of the object tracking apparatus 50. In other aspects, this display control device may be embedded in the display device 30.

Example of Hardware Configuration

An example of hardware configuration that may realize the object tracking apparatus (10 or 50) according to any of the above-described exemplary embodiments will be described. The above-described object tracking apparatus (10 or 50) may be realized by a dedicated apparatus or by a computer (information processing apparatus).

FIG. 19 is a diagram for illustrating the hardware configuration of a computer (information processing apparatus) capable of realizing respective exemplary embodiments.

The hardware of an information processing apparatus (computer) 700 may include a CPU (central processing unit) 11, a communication interface (I/F) 12, an input/output user interface 13, a ROM (read only memory) 14, a RAM (random access memory) 15, a memory device 17 and a drive device 18 for a computer-readable memory medium 19, and these components may be coupled with one another via a bus 16. The input/output user interface 13 may be a man-machine interface such as a keyboard, which is an example of an input device, a display, which is an example of an output device, or the like. The communication interface 12 may be a typical communication means used for the apparatus according to any of the above-described exemplary embodiments (illustrated in FIG. 1 or FIG. 9) to communicate with external apparatuses via a communication network 600. In the above hardware configuration, the CPU 11 may control the entire motion of the information processing apparatus 700 that realizes the object tracking apparatus (10 or 50) according to any of the above-described exemplary embodiments.

After a program (computer program) that can realize processing described in the above-described respective exemplary embodiments is provided to the information processing apparatus 700 illustrated in FIG. 19, the present disclosure, which has been described in the forms of the above-described exemplary embodiments, is realized by making the CPU 11 execute the program. Such a program as above may be a program that is capable of realizing various processes described in the flowchart (FIG. 8), which is referred to in the explanations of the above-described respective exemplary embodiments, or that is capable of realizing the respective units (blocks) in the corresponding devices illustrated in the block diagrams in FIG. 1, FIG. 4 to FIG. 6, FIG. 9, and FIG. 15 to FIG. 17.

The program provided to the information processing apparatus 700 may be stored in a temporary read/write memory (15) or in a nonvolatile memory device (17) such as a hard disk drive. In some embodiments, in the memory device 17, a program group 17A may include, for example, programs that can realize the functions of the respective units illustrated in the object tracking apparatus (10 or 50) according to any of the above-described respective examples and embodiments. In some embodiments, various kinds of stored information 17B may be, for example, object tracking results in the above-described respective exemplary embodiments, camera videos, camera parameters, areas of coordinate values in the common coordinate system that are viewable to respective cameras 20, and the like. In some embodiments, in the installation of the programs in the information processing apparatus 700, the configuration units of respective program modules are be limited to the segments corresponding to respective blocks illustrated in the block diagrams (in FIG. 1, FIG. 4 to FIG. 6, FIG. 9, and FIG. 15 to FIG. 17), and those skilled in the art can appropriately select a segmentation method of the programs in their installation of the programs.

In the above-described case, many typical procedures may be adopted nowadays as a provision method of the programs to the above apparatus such as a method in which the programs are installed to the above apparatus via a computer readable various media (19) such as a CD (compact disk)-ROM, or a flash memory, and a method in which the programs are downloaded via a communication line (600) such as the Internet. In this case, the present disclosure may include codes that forms such programs as above (program group 17A), or the memory medium (19) that stores such codes.

The present disclosure has been described as an example which is applied to the above-described typical exemplary embodiments. The technological scope, however, is not limited to the scope described in the above respective exemplary embodiments. It will be obvious to those skilled in the art that various variations and modifications may be made in the above respective exemplary embodiments. Even in a case where such variations and modifications are added to the above exemplary embodiments, it can be said that a new exemplary embodiment falls within the technological scope. This is obvious from items described in the accompanying claims.

The invention claimed is:

1. An object tracking apparatus, comprising:
a memory storing instructions; and
at least one processor configured to process the instructions to:
generate, via a first detector, a first detection result of an object from a first video;
generate, via a second detector, a second detection result of the object from a second video;
generate first tracking information of the object based on an association of previous tracking information with the first and second detection results, wherein:
the first tracking information is represented in a common coordinate system that is associated with the first detection result and the second detection result, and
the association is based on at least one of a likelihood of the first and second detection results in a current frame and a likelihood of the previous first tracking information in a previous frame; and
send the first tracking information to the first detector and the second detector for detecting an object in a following frame by using the first tracking information, with which detection parameters for the first detector and the second detector are updated.

2. The object tracking apparatus according to claim 1, wherein the at least one processor is configured to process the instructions to detect the object from videos output from cameras.

3. The object tracking apparatus according to claim 1, wherein the at least one processor is configured to process the instructions to:
generate second tracking information of the object, wherein the second tracking information is represented in an individual coordinate system associated with one of the first and second detection results; and
determine a searching area for searching for the object based on the second tracking information;
wherein at least one of the first and second detection results is generated based on the determined searching area.

4. The object tracking apparatus according to claim 3, wherein the at least one processor is configured to process the instructions to display the searching area on a display device.

5. The object tracking apparatus according to claim 3, wherein the first and second detection results are generated based on one or more detection parameters;
wherein the one or more detection parameters are updated based on at least one of the first and second tracking information; and
wherein the first tracking information is generated based on a relationship between the first and second detection results.

6. The object tracking apparatus according to claim 1,
wherein the at least one processor is configured to process the instructions to:
calculate a first likelihood that reflects a likelihood of the object included in at least one of the first and second detection results;
wherein the object is tracked based on the first likelihood.

7. The object tracking apparatus according to claim 1,
wherein the at least one processor is configured to process the instructions to:
calculate a second likelihood that reflects an accuracy of tracking of past positions of the object;
wherein the object is tracked based on the second likelihood.

8. The object tracking apparatus according to claim 1,
wherein the first detection result is generated at a prior time than the second detection result;
wherein the first detection result and second detection result include time information;
wherein the at least one processor is configured to process the instructions to:
determine that the object is included in the first detection result; and
associate the object with the second detection result based on a chronological order of the time information between the first and second detection results; and
wherein the tracking of the object is based on the association.

9. The object tracking apparatus according to claim 1,
wherein the first detection result and second detection result include time information;
wherein the at least one processor is configured to process the instructions to:
determine that the object is included in the first detection result; and
associate the object with the second detection result based on the time information that indicates the first and second detection results are generated within a predetermined time period; and
wherein the tracking of the object is based on the association.

10. The object tracking apparatus according to claim 1,
wherein the at least one processor is configured to process the instructions to:
transform the first tracking information represented in the common coordinate system into the second tracking information represented in the individual coordinate systems associated with, respectively, the first and second detection results; and
transform at least one of first and second detection results represented in the individual coordinate systems to detection results represented in a common coordinate system.

11. The object tracking apparatus according to claim 1,
wherein the at least one processor is configured to process the instructions to:
generate information related to an appearance of the object based on at least one of the first and second detection results; and
include the information related to the appearance of the object into the tracking information;
wherein at least one of the first and second detection results are generated based on the information related to the appearance of the object included in the tracking information.

12. The object tracking apparatus according to claim 11,
wherein the information related to the appearance of the object includes information that indicates an overlapping between the object and other objects derived from the first and second detection results; and
wherein the at least one processor is configured to process the instructions to:
determine the overlapping between the object and the other objects based on at least one of the first and second detection results;
update the information related to the appearance of the object based on the overlapping; and
wherein at least one of the first and second detection results are generated based on the updated information related to the appearance of the object included in the tracking information.

13. An object tracking system comprising cameras and an object tracking apparatus, wherein the object tracking apparatus includes:
a memory storing instructions; and
at least one processor configured to process the instructions to:
generate, via a first detector, a first detection result of an object from a first video;
generate, via a second detector, a second detection result of the object from a second video;
generate first tracking information of the object based on an association of previous tracking information with the first and second detection results, wherein:
the first tracking information is represented in a common coordinate system that is associated with the first detection result and the second detection result, and
the association is based on at least one of a likelihood of the first and second detection results in a current frame and a likelihood of the previous first tracking information in a previous frame; and
send the first tracking information to the first detector and the second detector for detecting an object in a following frame by using the first tracking information, with which detection parameters for the first detector and the second detector are updated.

14. An object tracking method comprising:
generating, via a first detector, a first detection result of an object from a first video;
generating, via a second detector, a second detection result of the object from a second video;
generating, by a processor, first tracking information of the object based on an association of previous tracking information with the first and second detection results, wherein:
the first tracking information is represented in a common coordinate system that is associated with the first detection result and the second detection result, and
the association is based on at least one of a likelihood of the first and second detection results in a current frame and a likelihood of the previous tracking information in a previous frame; and
sending the first tracking information to the first detector and the second detector for detecting an object in a following frame by using the first tracking information, with which detection parameters for the first detector and the second detector are updated.

15. An object detection device, comprising:
a memory storing instructions; and
at least one processor configured to process the instructions to:

detect an object from videos on a basis of tracking information represented in a common coordinate system; and send the tracking information to a first detector and a second detector for detecting an object in a following frame by using the tracking information, with which detection parameters for the first detector and the second detector are updated, wherein:

the tracking information indicates tracking result of the object tracked on a basis of a plurality of detection results output from a plurality of object detectors, and the tracking information is generated in accordance with at least one of a likelihood of object detection in a current frame and a likelihood of the previous tracking information in a previous frame.

16. A non-transitory computer-readable storage medium storing instructions that when executed by a computer enable the computer to implement a method comprising:

generating, via a first detector, a first detection result of an object from a first video;

generating, via a second detector, a second detection result of the object from a second video;

generating first tracking information of the object based on an association of previous tracking information with the first and second detection results, wherein:

the first tracking information is represented in a common coordinate system that is associated with the first detection result and the second detection result, and the association is based on at least one of a likelihood of the first and second detection results in a current frame and a likelihood of the previous tracking information in a previous frame; and sending the first tracking information to the first detector and the second detector for detecting an object in a following frame by using the first tracking information, with which detection parameters for the first detector and the second detector are updated.

17. The object tracking apparatus according to claim 1, wherein the at least one processor is configured to process the instructions to:

temporarily store the first and second detection results including location information of the object obtained by the first and second detectors, wherein generating the first tracking information of the object includes calculating a statistic value indicating the object location with the first and second detection results temporarily stored in predetermined period.

18. The object tracking apparatus according to claim 3, wherein the at least one processor is further configured to:

detect the object in the search area.

19. The object tracking apparatus according to claim 18, wherein the at least one processor is further configured to:

obtain the first and second detection results of the object; and estimate a position of the object by integrating the obtained detection results during a cyclic period.

20. The object tracking apparatus according to claim 19, wherein the at least one processor is further configured to:

weight the first and second detection results of the object; and calculate a statistic value obtained from the weighted detection results of the object, and set the position indicated by the calculated statistic value to the position of the object.

21. The object tracking apparatus according to claim 11, wherein the appearance of the object is a degree of overlap among the object and another object.

\* \* \* \* \*